(12) United States Patent
Lin et al.

(10) Patent No.: US 12,486,588 B2
(45) Date of Patent: Dec. 2, 2025

(54) HYDROGEN GENERATOR CAPABLE OF SELECTIVELY ADJUSTING GAS FLOW DIRECTION

(71) Applicant: SHANGHAI ASCLEPIUS MEDITEC CO., LTD., Shanghai (CN)

(72) Inventors: Hsin-Yung Lin, Taoyuan (CN); Jie Zhang, Shanghai (CN)

(73) Assignee: Shanghai Asclepius Meditec Co., Ltd., Shanghai (CN)

( * ) Notice: Subject to any disclaimer, the term of this patent is extended or adjusted under 35 U.S.C. 154(b) by 430 days.

(21) Appl. No.: 17/998,138

(22) PCT Filed: Apr. 13, 2021

(86) PCT No.: PCT/CN2021/086978
§ 371 (c)(1),
(2) Date: Nov. 7, 2022

(87) PCT Pub. No.: WO2021/223580
PCT Pub. Date: Nov. 11, 2021

(65) Prior Publication Data
US 2023/0212766 A1  Jul. 6, 2023

(30) Foreign Application Priority Data

May 7, 2020  (CN) .......................... 202010376864.9

(51) Int. Cl.
*C25B 15/00* (2006.01)
*A61M 16/10* (2006.01)
(Continued)

(52) U.S. Cl.
CPC ........... *C25B 15/08* (2013.01); *A61M 16/105* (2013.01); *A61M 16/1075* (2013.01); *A61M 16/12* (2013.01); *C25B 1/04* (2013.01)

(58) Field of Classification Search
CPC .................................. C25B 15/08; C25B 1/04
See application file for complete search history.

(56) References Cited

U.S. PATENT DOCUMENTS

| 2015/0190604 A1 | 7/2015 | Lin |
| 2016/0108528 A1* | 4/2016 | Lin ........................ C25B 15/08 204/278 |

(Continued)

FOREIGN PATENT DOCUMENTS

| CN | 105696012 A | 6/2016 |
| CN | 106435633 A | 2/2017 |

(Continued)

OTHER PUBLICATIONS

Extended European Search Report mailed to Corresponding Patent Application No. 21799562.0-1122 dated Apr. 16, 2024.
(Continued)

*Primary Examiner* — Zulmariam Mendez
(74) *Attorney, Agent, or Firm* — Rosenberg, Klein & Lee

(57) ABSTRACT

A hydrogen generator comprises an electrolytic module, a hydrogen water cup, an integrated passageway device and an automatic diversion device. The electrolytic module is configured to electrolyze water and generate gas comprising hydrogen. The hydrogen water cup is configured for containing liquid, and injecting the gas comprising hydrogen into the liquid to form hydrogen liquid. The integrated passageway device is stacked above the electrolytic module, and includes an inlet gas passageway, an outlet gas passageway and a gas communication passageway. The automatic diversion device is configured for selectively communicating the inlet gas passageway, the hydrogen water cup and the outlet gas passageway or selectively communicating the inlet gas passageway, the gas communication passageway and the outlet gas passageway.

15 Claims, 23 Drawing Sheets

(51) Int. Cl.
*A61M 16/12* (2006.01)
*C25B 1/04* (2021.01)
*C25B 15/08* (2006.01)

(56) References Cited

U.S. PATENT DOCUMENTS

| | | |
|---|---|---|
| 2018/0002822 A1 | 1/2018 | Lin |
| 2019/0126096 A1 | 5/2019 | Squibb |

FOREIGN PATENT DOCUMENTS

| | | |
|---|---|---|
| CN | 206315349 U | 7/2017 |
| CN | 107551373 A | 1/2018 |
| CN | 108531930 A | 9/2018 |
| CN | 108950588 A | 12/2018 |
| CN | 209500485 U | 10/2019 |
| CN | 209873126 U | 12/2019 |
| CN | 111910199 A | 11/2020 |
| EP | 3018103 A2 | 5/2016 |
| EP | 3263166 A1 | 1/2018 |
| JP | 5900688 B1 | 4/2016 |
| JP | 2018163596 A | 10/2018 |
| JP | 2019104664 A | 6/2019 |
| JP | 2020183579 A | 11/2020 |
| SG | 10202004106 U | 12/2020 |

OTHER PUBLICATIONS

Office Action mailed to Chinese Counterpart Patent Application No. 202010376864.9 on Nov. 9, 2023.

Office Action mailed to Japanese Counterpart Patent Application No. 2022-567601 on Jan. 9, 2024.

International Search Report and Written Opinion dated Jun. 25, 2021 for International Application No. PCT/CN2021/086978.

Office Action mailed to Corresponding Singapore Patent Application No. 11202254840S dated Jan. 1, 2025.

\* cited by examiner

HYDROGEN GENERATOR CAPABLE OF SELECTIVELY ADJUSTING GAS FLOW DIRECTION

CROSS-REFERENCE TO RELATED APPLICATION

This application is a national stage application, filed under 35 U.S.C. § 371, of International Patent Application No. PCT/CN2021/086978 filed on Apr. 13, 2021, which claims the priority of Chinese application No. 202010376864.9 filed May 7, 2020, the contents of which are incorporated by reference.

BACKGROUND OF THE INVENTION

1. Field of the Invention

The present invention relates to a hydrogen generator. More particularly, to a hydrogen generator capable of selectively adjusting gas and/or water flow direction. Wherein, the hydrogen generator has a hydrogen water cup, and the hydrogen water cup accommodates an injection component with micro outlet structure.

2. Description of the Prior Art

As people have always been paying much attention on health developments, many developments in medical technology are often targeted on treating diseases and prolonging human life. Most of the treatments in the past are passive, which means that the disease is treated only when it occurs. The treatments include an operation, a medication treatment, a radiation therapy, or even a medical treatment for cancer. However, in recent years, most of the researches from medical experts are gradually moving towards preventive medical methods, such as research on healthy food, screening and the prevention of inherited diseases, which actively prevents diseases from occurring in the future. Due to the focus of the prolongation of human life, many anti-aging and anti-oxidation technologies including skin care products and anti-oxidation food/medicine are gradually being developed and becoming increasingly popular to the general public.

Studies have found that there are instable oxygen species (O+), also known as free radicals, in the human body, wherein the free radicals are usually generated due to diseases, diet, environment or one's lifestyle. Free radicals are atoms, molecules or ions with a single unpaired electron. Free radicals will attack human cell membranes, cells, and tissues to rob electrons from other atoms, resulting in a chain peroxidation reaction in the human body. Peroxidation reaction will lead to degenerative syndromes, such as fragile blood vessels, aging brain cells, fragile immune system, cataracts, degenerative arthritis, sagging skin, and general aging. Many studies have pointed out that hydrogen-rich water can easily enter cell channels to be absorbed, participate in human metabolism, and promote cell detoxification due to its small molecular particles. Drinking hydrogen-rich water can indirectly reduce the number of free radicals in the human body, restore the body condition from an acidic state to a healthy alkaline state, and achieve the effect of eliminating chronic diseases and beautifying the skin.

In the prior art, most hydrogen generators capable of generating hydrogen water and hydrogen gas at the same time generate gas containing hydrogen through an electrolysis module, inject the gas containing hydrogen into drinking water, and then output insoluble gas containing hydrogen for user inhalation. However, when the gas containing hydrogen is injected into drinking water, low-frequency sounds are produced. If the user uses the hydrogen generator to inhale gas containing hydrogen while sleeping, the low-frequency sound will affect the user's sleep quality, thereby adversely affecting the user's health. Therefore, how to solve the connection problem between the hydrogen water cup and the electrolysis module is one of the topics that needs to be researched and developed urgently.

In addition, the hydrogen generator often injects the gas containing hydrogen directly into the water through the gas pipe to generate hydrogen water. However, the shape of the gas comprising hydrogen injected into the water is often not small bubbles, and the gas comprising hydrogen cannot be smoothly dissolved in the water because the interfacial area between the gas comprising hydrogen and the water is insufficient. According to the document published by the International Hydrogen Standard Association (IHSA) in 2017, the hydrogen concentration in hydrogen water needs to be higher than 0.5 ppm of the mass concentration to produce biological effects. Under standard conditions, i.e., at atmospheric pressure and 20 degrees Celsius, the maximum physical limit for hydrogen dissolved in water is 1.6 ppm. Therefore, how to make the hydrogen content in water higher than 0.5 ppm and close to 1.6 ppm is another subject to be researched and developed urgently.

SUMMARY OF THE INVENTION

In view of this, the present invention provides a hydrogen generator capable of selectively adjusting gas flow direction comprising an electrolytic module, a hydrogen water cup, an integrated passageway device and an automatic diversion device. The electrolytic module is configured to electrolyze water to generate gas comprising hydrogen. The hydrogen water cup is configured for containing liquid and injecting the gas comprising hydrogen into the liquid to form hydrogen liquid. The integrated passageway device is stacked above the electrolytic module, and comprises a gas inlet passageway, a gas outlet passageway and a gas communication passageway. Wherein, the gas inlet passageway is configured to receive the gas comprising hydrogen, and the gas outlet passageway is configured to output the gas comprising hydrogen. The automatic diversion device selectively connects the gas inlet passageway, the hydrogen water cup and the outlet gas outlet passageway for injecting the gas comprising hydrogen into the hydrogen water cup and then outputting the gas comprising hydrogen through the gas outlet passageway, or selectively connects the gas inlet passageway, the gas communication passageway and the gas outlet passageway for outputting the gas comprising hydrogen through the gas communication passageway and the gas outlet passageway.

Wherein, the hydrogen generator further comprises a nebulizer coupled to the gas outlet passageway to receive the gas comprising hydrogen. The nebulizer is capable of selectively generating atomized gas and mixing the atomized gas with the gas comprising hydrogen to form healthy gas.

When the gas comprising hydrogen is injected into the hydrogen water cup and then outputted through the gas outlet passageway, the nebulizer generates atomized gas; when the gas comprising hydrogen is outputted through the gas communication passageway and the gas outlet passageway, the nebulizer stops generating atomized gas.

Wherein, the hydrogen generator further comprises a pressure sensor and a monitor. The pressure sensor is coupled to at least one of the gas inlet passageway and the gas outlet passageway correspondingly. The pressure sensor is configured for sensing a gas pressure in at least one of the gas inlet passageway and the gas outlet passageway, and generating a pressure sensing signal. The monitor is coupled to the pressure sensor to selectively shut down the electrolytic module based on the pressure sensing signal.

The hydrogen generator further comprises a frame configured for embedding the hydrogen water cup therein to couple the hydrogen water cup with the integrated passageway device by the frame. Wherein, when the hydrogen water cup is detached from the frame and is not coupled with the integrated passageway device, the electrolytic module stops the operation.

Wherein the hydrogen generator further comprises a condensate filter coupled to the integrated passageway device for condensing and filtering the gas comprising hydrogen. The integrated passageway device comprises a lower cover, and the lower cover has a space for accommodating the condensate filter; the lower cover has a flip structure for the condensate filter to be moveably embedded into the integrated passageway device. Wherein, the gas comprising hydrogen is transferred among the hydrogen water cup, the automatic diversion device, and the condensate filter by the integrated passageway device. The lower cover is an integral formed structure, and the automatic diversion device and the condensate filter are directly coupled to the lower cover.

The hydrogen generator further comprises a water tank, a humidification cup, and a filter rod. The water tank is stacked below the integrated passageway device and coupled to the electrolytic module. The water tank is configured for accommodating the water and receiving the gas comprising hydrogen from the electrolytic module. The humidification cup is stacked above the water tank. The humidification cup has a humidification room and a filter room, and the humidification room is configured to accommodate supplementary water. The filter rod is accommodated in the filter room for filtering the gas comprising hydrogen flowing through the filter room. Wherein, the gas comprising hydrogen is transferred among the hydrogen water cup, the automatic diversion device, the condensate filter, the humidification cup and the filter rod by the integrated passageway device. The automatic diversion device, the condensate filter, and the humidification cup are directly coupled to the lower cover.

Wherein, the lower cover has a humidification channel for fluidly coupling the condensate filter with the humidification room; the lower cover has a filter channel for fluidly coupling the humidification room with the filter room.

The filter room has a filter room inlet and a filter room outlet, and the filter rod has a filter inlet and a filter outlet. The filter rod further comprises a gas barrier ring on the outside of the filter rod configured to divide the filter room into a pre-filter space and a filtered space. The pre-filter space is coupled to the filter room inlet and the filter inlet, and the filtered space is coupled to the filter room outlet and the filter outlet.

Wherein, the condensate filter further comprises a condensate passageway, the lower cover has a condensate channel coupled to the condensate passageway. The humidification cup comprises a communicating room for coupling the water tank with the condensate filter. Wherein, the humidification room, the communicating room, and the filter room are isolated from each other.

The hydrogen generator further comprises an electrolyte filter module configured in the communicating room of the humidification cup, and the electrolyte filter module has a continuous upward sloping channel to receive and filter the gas comprising hydrogen from the water tank.

Wherein, the hydrogen generator comprises a valve assembly, and the valve assembly further comprises an output passageway, a supply passageway, a first valve and a pump. The output passageway is coupled to the condensate filter and the humidification cup to transfer the gas comprising hydrogen. The supply passageway is coupled to the condensate filter and the humidification cup to transfer the supplementary water. The first valve is coupled to the output passageway and the supply passageway and configured to selectively deblock the output passageway or the supply passageway. The pump drives the supplementary water contained in the humidification cup to the water tank through the condensate filter. Wherein, the gas comprising hydrogen is transferred among the hydrogen water cup, the automatic diversion device, the condensate filter, the humidification cup, the filter rod and the valve assembly by the integrated passageway device. The automatic diversion device, the condensate filter, the humidification cup and the valve assembly are directly coupled to the lower cover.

When the first valve deblocks the output passageway, the gas comprising hydrogen is transferred to the humidification cup through the condensate filter; when the first valve deblocks the supply passageway, the supplementary water driven by the pump is transferred to the water tank through the condensate filter.

The valve assembly further comprises an output channel and a second valve. When the first valve deblocks the supply passageway, the second valve deblocks the output channel to make the humidification room to be connected to the water tank.

Wherein, the hydrogen generator further comprises a filter device pluggably coupled to the nebulizer for filtering germs in the gas comprising hydrogen.

The present invention also provides a hydrogen generator capable of selectively adjusting gas flow direction and comprising an electrolytic module, a water tank, a condensate filter, a humidification cup, an integrated passageway device, a hydrogen water cup, a nebulizer and a valve assembly. The electrolytic module is configured to electrolyze water to generate gas comprising hydrogen. The water tank is configured to accommodate the water and the electrolytic module for receiving the gas comprising hydrogen from the electrolytic module. The condensate filter is stacked above the water tank for receiving and filtering the gas comprising hydrogen. The humidification cup is stacked above the water tank to accommodate supplementary water and humidify the gas comprising hydrogen. The integrated passageway device is stacked above the water tank and comprises a plurality of channels, a gas inlet passageway and a gas outlet passageway. The gas inlet passageway is configured to receive the gas comprising hydrogen, and the gas outlet passageway is configured to output the gas comprising hydrogen. The hydrogen water cup is configured for containing liquid, and the hydrogen water cup is capable of receiving the gas comprising hydrogen and mixing the gas comprising hydrogen with the liquid to form hydrogen liquid. The nebulizer is configured to selectively generate atomized gas and mix the atomized gas with the gas comprising hydrogen to form healthy gas. The valve assembly is configured to selectively make the gas comprising hydrogen from the water tank to flow to the condensate filter and the humidification cup, and to selectively make the supplementary water flow to the condensate filter and the water tank. Wherein, the integrated passageway device comprises a lower cover, and the lower cover has a space for accommodating the condensate filter. The condensate filter, the humidification cup and the nebulizer are directly coupled to the integrated passageway device.

Wherein, the integrated passageway device has a flip structure configured for the condensate filter to be moveably embedded into the integrated passageway device.

The hydrogen generator further comprises an automatic diversion device, and the integrated passageway device comprises a gas communication passageway. The automatic diversion device is configured to selectively connect the gas inlet passageway, the hydrogen water cup and the gas outlet passageway for injecting the gas comprising hydrogen into the hydrogen water cup and then outputting the gas comprising hydrogen through the gas outlet passageway, or configured to selectively connect the gas inlet passageway, the gas communication passageway and the gas outlet passageway for outputting the gas comprising hydrogen through the gas communication passageway and the gas outlet passageway. Wherein, the gas comprising hydrogen is transferred among the condensate filter, the humidification cup, the hydrogen water cup, the nebulizer, the valve assembly and the automatic diversion device by the integrated passageway device. The condensate filter, the humidification cup, the nebulizer, and the automatic diversion device are directly coupled to the integrated passageway device.

When the automatic diversion device connects the gas inlet passageway, the gas communication passageway and the gas outlet passageway for outputting the gas comprising hydrogen through the gas communication passageway and the gas outlet passageway, the nebulizer stops the operation.

Wherein, the humidification cup comprises a humidification room, a communicating room, and a filter room. The humidification room is configured to accommodate the supplementary water and receive the gas comprising hydrogen. The communicating room is configured to fluidly couple to the water tank and the condensate filter. The filter room is configured to accommodate a filter rod. Wherein, the humidification room, the communicating room and the filter room are isolated from each other.

The hydrogen generator further comprises an electrolyte filter module configured in the communicating room of the humidification cup, wherein the electrolyte filter module has a continuous upward sloping channel to receive and filter the gas comprising hydrogen from the water tank.

The filter room has a filter room inlet and a filter room outlet, and the filter rod has a filter inlet and a filter outlet. The filter rod comprises a gas barrier ring on the outside of the filter rod configured to divide the filter room into a pre-filter space and a filtered space. Wherein, the pre-filter space is coupled to the filter room inlet and the filter inlet, and the filtered space is coupled to the filter room outlet and the filter outlet.

Wherein, the hydrogen water cup is directly coupled to the integrated passageway device.

The hydrogen water cup comprises a cup body, an injection component, and a cup cover. The cup body has an accommodating space for containing the liquid. The injection component is accommodated in the accommodating space for injecting the gas comprising hydrogen into the liquid to form the hydrogen liquid. The cup cover is coupled to the cup body and has a gas inlet for receiving the gas comprising hydrogen, a gas outlet for outputting the gas comprising hydrogen, and an input/output port for outputting the hydrogen liquid. Wherein, the input/output port is capable of injecting the liquid.

The injection component comprises a gas injection column and a gas injection base. The gas injection column is coupled to the gas inlet, and the gas injection column has a first gas injection channel. The gas injection base is immersed in the liquid, and comprises a gas injection body, a gas injection housing, and a plurality of micro filters. The gas injection body is coupled to the gas injection column, and the gas injection body has a second gas injection channel and a plurality of gas injection pores. The second gas injection channel is fluidly coupled to the first gas injection channel, and the gas injection pores are fluidly coupled to the second gas injection channel. The gas injection housing is coupled to the gas injection body and has a plurality of micro outlet channels corresponding to the plurality of gas injection pores. The plurality of micro filters are located between the gas injection body and the gas injection housing, wherein the plurality of micro filters are coupled to the plurality of micro outlet channels.

Wherein, each of the micro outlet channels is a hollow conical frustum structure, and the hollow conical frustum structure has an upper hole and a lower hole. An area of the upper hole is greater than an area of the lower hole. The lower hole is located between the second gas injection channel and the micro outlet channel, and the upper hole is located between the micro outlet channel and the accommodating space.

Wherein, the sectional area of the second gas injection channel is non-uniform.

The hydrogen generator further comprises a fining device configured in the humidification cup, wherein the fining device comprises a communicating column and a fining base plate. The fining base plate comprises a fining channel and a plurality of fining pores, and the sectional area of the fining channel is non-uniform.

The present invention further provides a hydrogen generator capable of selectively adjusting gas flow direction comprising an electrolytic module, a water tank, a condensate filter, a humidification cup, and an integrated passageway device. The electrolytic module is configured to electrolyze water to generate gas comprising hydrogen. The water tank is configured to accommodate the water and the electrolytic module for receiving the gas comprising hydrogen from the electrolytic module. The condensate filter is stacked above the water tank for receiving and filtering the gas comprising hydrogen. The humidification cup is stacked above the water tank to accommodate supplementary water and humidify the gas comprising hydrogen. The integrated passageway device is stacked above the water tank and is directly coupled to the condensate filter and the humidification cup. Wherein, the gas comprising hydrogen is transferred between the condensate filter and the humidification cup by the integrated passageway device.

The hydrogen generator further comprises a hydrogen water cup for containing liquid, and the hydrogen water cup is capable of receiving the gas comprising hydrogen and mixing the gas comprising hydrogen with the liquid to form hydrogen liquid. Wherein, the hydrogen water cup is directly coupled to the integrated passageway device, and the gas comprising hydrogen is transferred among the condensate filter, the humidification cup, the hydrogen water cup and the nebulizer by the integrated passageway device.

Wherein, the humidification cup comprises a filter room for accommodating a filter rod. The filter rod is configured to filter the gas comprising hydrogen flowing through the filter room. The hydrogen water cup is directly coupled to the integrated passageway device, and the gas comprising hydrogen is transferred among the condensate filter, the humidification cup, the filter rod, the hydrogen water, and the nebulizer by the integrated passageway device.

Compared to the prior art, the hydrogen generator of the present invention has following advantages: (1) The hydrogen generator of the present invention has an automatic diversion device to selectively make the gas comprising hydrogen flow into the liquid of the hydrogen water cup based on the first diversion signal or the second diversion signal; therefore, the hydrogen generator can be adjusted to not pass the gas comprising hydrogen into the hydrogen water cup in the night mode, thereby eliminating the low-frequency sound generated when the gas comprising hydrogen enters into the hydrogen water cup. (2) The hydrogen generator of the present invention has a pressure sensor for sensing whether the flow channel for conveying the gas comprising hydrogen is unobstructed. When the user squeezes the relevant pipeline, the pressure sensor will sense the pressure change in the gas flow channel and report it to the monitor, so that the monitor can adjust the action of the electrolysis module to avoid danger. (3) The hydrogen generator of the present invention has a valve assembly for adjusting the water replenishment mechanism in the hydrogen generator, in order to ensure the smooth flow of gas comprising hydrogen and supplementary water in the flow channel, and to ensure that the hydrogen generator is safe during the gas production process and the water replenishment process. (4) The hydrogen gas of the present invention not only can filter the impurities out of the gas comprising hydrogen but also can filter microorganisms out of the gas comprising hydrogen, so as to ensure that the liquid containing hydrogen and the gas containing hydrogen are safe to the human body. (5) The hydrogen water cup of the present invention has a microbubble outlet structure, wherein the microbubble outlet structure has a plurality of micro outlet channels with a hollow conical frustum structure. The microbubble outlet structure can make the fined gas comprising hydrogen form a plurality of microbubbles in the liquid and uniformly disperse in the liquid to form a hydrogen liquid, thereby increasing the interfacial area between the gas comprising hydrogen and the liquid to promote the dissolution of the gas comprising hydrogen in the liquid. (6) The microbubble outlet structure of the present invention is coupled to the micro filters, so the gas comprising hydrogen can be filtered again before being injected into the liquid, thereby ensuring the quality of the hydrogen liquid.

BRIEF DESCRIPTION OF THE APPENDED DRAWINGS

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention. However, it can be implemented in many different forms and is not limited to the embodiments of the present invention or corresponding embodiments. Rather, these embodiments are provided so that this disclosure will be thorough and complete.

The terms used in the various embodiments disclosed of the present invention are only used to describe specific embodiments, and are not intended to limit the various embodiments disclosed of the present invention. As used herein, the singular form also includes the plural form unless the context clearly indicates otherwise. Unless otherwise defined, all terms (including technical and scientific terms) used in this specification have the same meanings as commonly understood by one of ordinary skill in the art to which the various embodiments disclosed herein belong. The above terms (such as those defined in commonly used dictionaries) will be interpreted as having the same meaning as the contextual meaning in the same technical field, and will not be interpreted as having an idealized or overly formal meaning, Unless explicitly defined in the various embodiments disclosed herein.

In the description of this specification, the description with reference to the terms "an embodiment", "a specific embodiment", etc. means that a specific feature, structure, material, or characteristic described in conjunction with the embodiment is included in at least one embodiment of the present invention. In this specification, the schematic expressions of the above terms do not necessarily refer to the same embodiment. Furthermore, the particular features, structures, materials, or characteristics described may be combined in any suitable manner in any one or more embodiments.

In the description of the present invention, unless otherwise specified or limited, it should be noted that the terms "coupled", "connected", and "setup" should be understood in a broad sense. For example, they may be mechanically or electrically connected, may be connected directly, also may be connected by an intermediate medium. For those skilled in the art, the specific meanings of the above terms can be understood according to specific situations.

Figure 1:
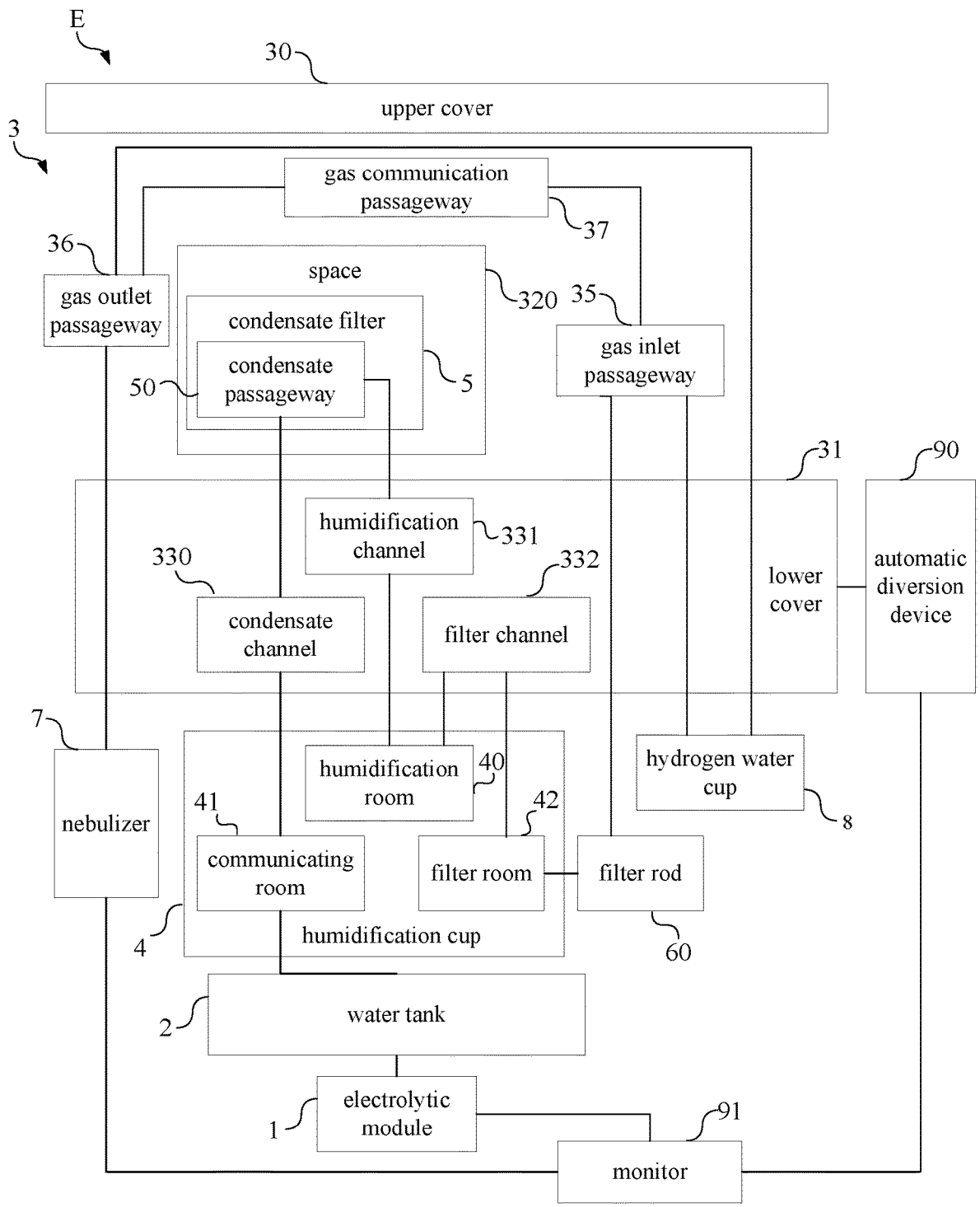
FIG. 1 is a functional block diagram illustrating a hydrogen generator capable of selectively adjusting gas flow direction according to an embodiment of the present invention.
Figure 2A:
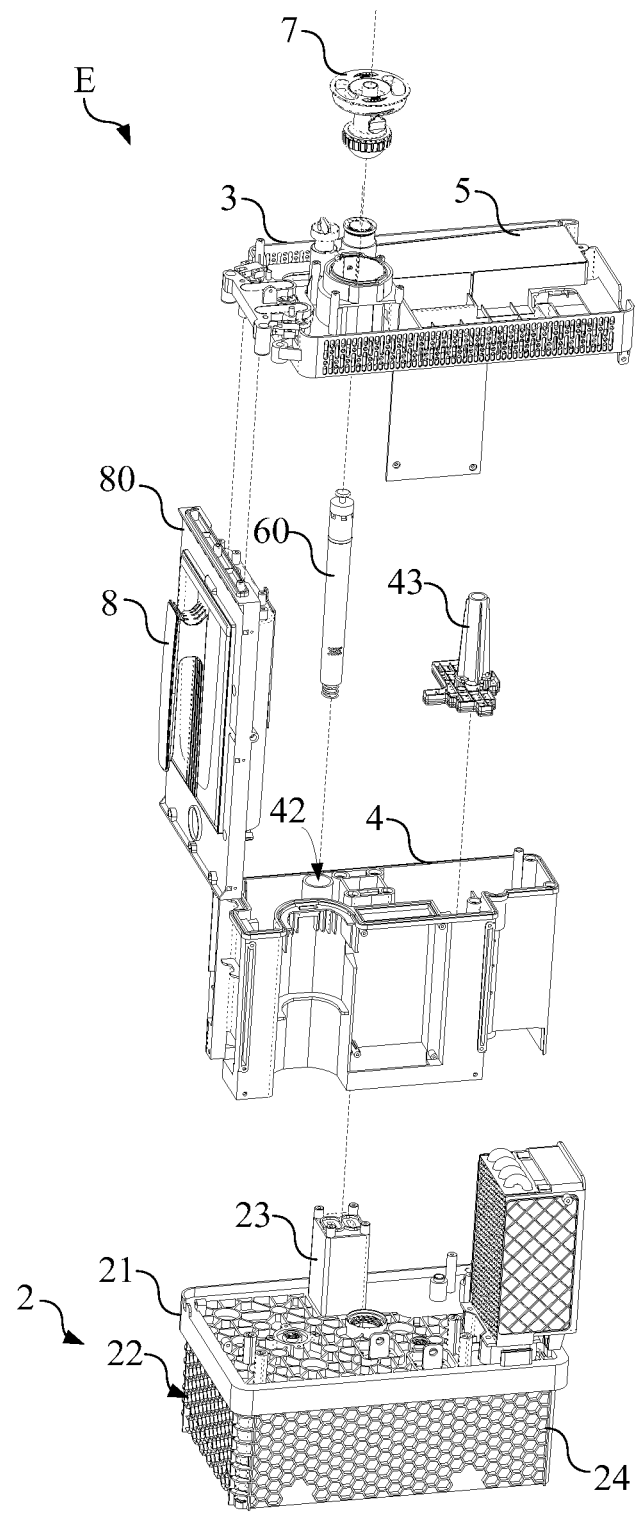
FIG. 2A is an exploded diagram illustrating the hydrogen generator according to the embodiment of FIG. 1.
Figure 2B:
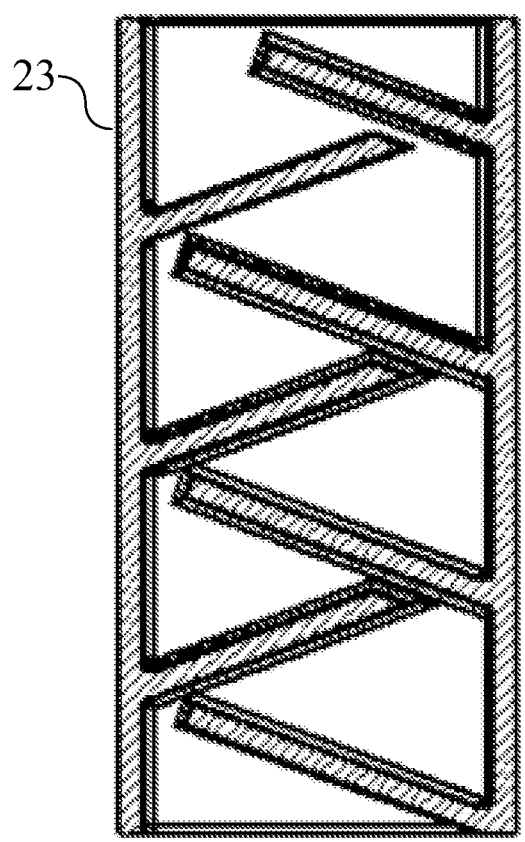
FIG. 2B is a cross-sectional schematic diagram illustrating the electrolyte filter module according to the embodiment of FIG. 2A.
Figure 2C:
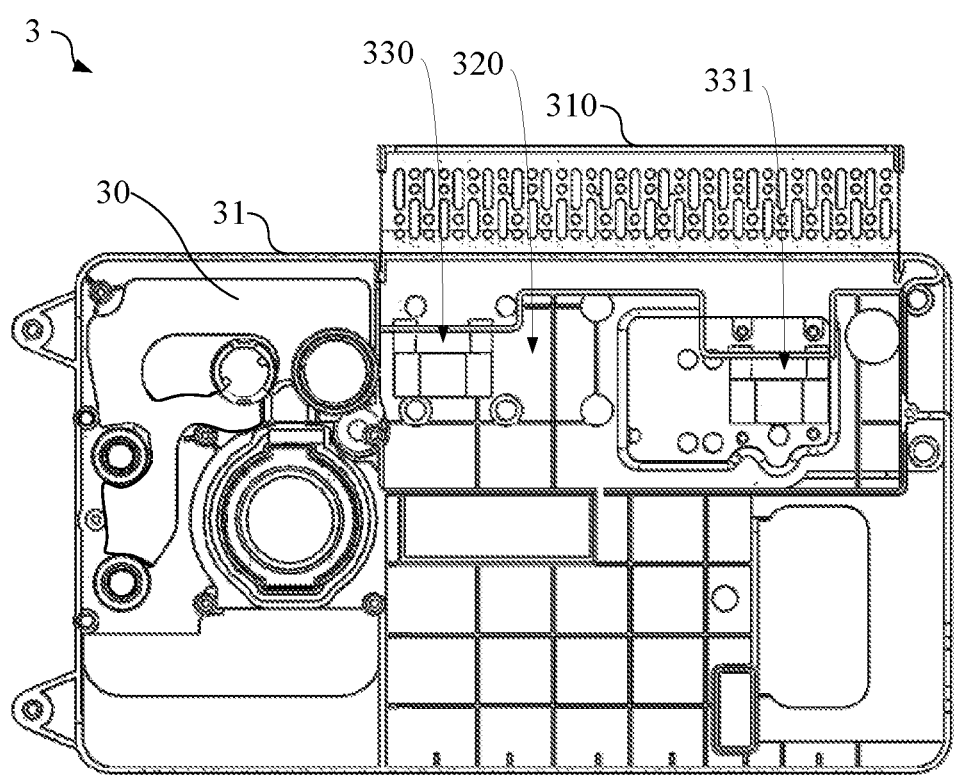
FIG. 2C is a top view of the integrated passageway device according to the embodiment of FIG. 2A.
Figure 2D:
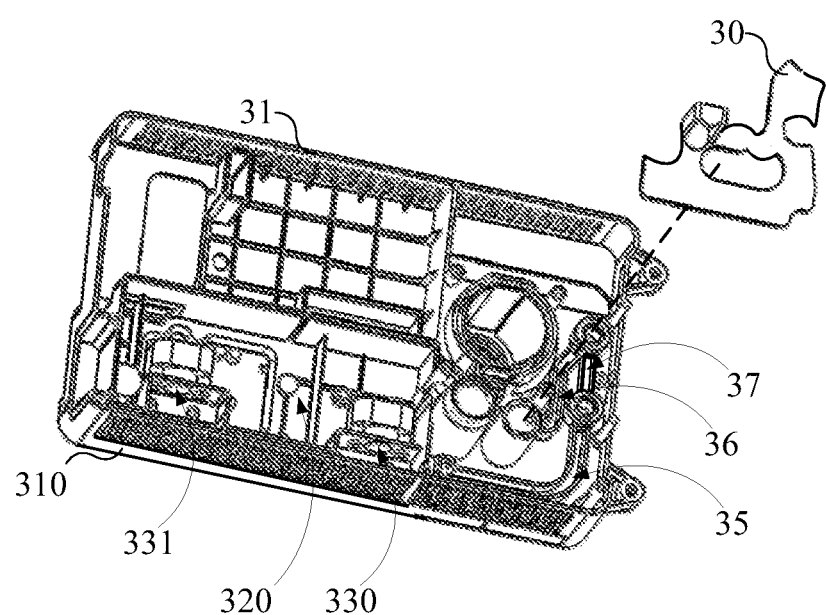
FIG. 2D is an exploded diagram illustrating the integrated passageway device according to the embodiment of FIG. 2C.
Figure 3:
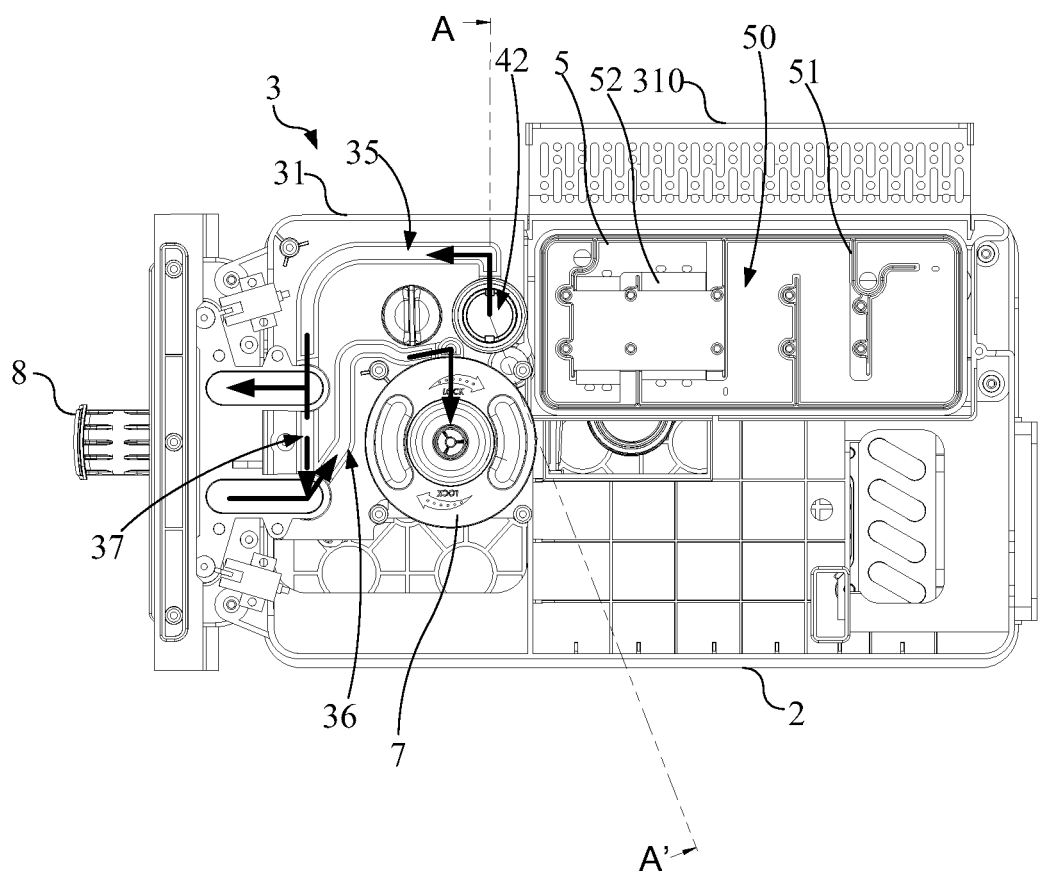
FIG. 3 is a top view of the hydrogen generator according to the embodiment of FIG. 2.

Please refer to FIG. 1, FIG. 2A to FIG. 2D. FIG. 1 is a functional block diagram illustrating a hydrogen generator capable of selectively adjusting gas flow direction E according to an embodiment of the present invention. FIG. 2A is an exploded diagram illustrating the hydrogen generator E according to the embodiment of FIG. 1. FIG. 2B is a cross-sectional schematic diagram illustrating the electrolyte filter module 23 according to the embodiment of FIG. 2A. FIG. 2C is a top view of the integrated passageway device 3 according to the embodiment of FIG. 2A. FIG. 2D is an exploded diagram illustrating the integrated passageway device 3 according to the embodiment of FIG. 2C. As shown in FIG. 1 and FIG. 2A, the hydrogen generator E of the present invention comprises an electrolytic module 1, a water tank 2, an integrated passageway device 3, a humidification cup 4, a condensate filter 5, a filter rod 60, a nebulizer 7, a hydrogen water cup 8, and a frame 80 configured for fixing the hydrogen water cup 8. The electrolytic module 1 is configured in the water tank 2. The water tank 2 comprises a tank body 21 and a tank cover 22, and an electrolyte filter module 23 is configured above the tank cover 22. As shown in FIG. 2B, the electrolyte filter module 23 comprises at least one of steel wool and polyester synthetic cotton. Wherein, the plurality of steel wool or the plurality of polyester synthetic cotton can be placed with an angle and spaced upwards to form a continuous upward sloping channel. The humidification cup 4 and the condensate filter 5 are stacked above the water tank 2. The electrolytic module 1 is configured to electrolyze water to generate gas comprising hydrogen. Wherein, the gas comprising hydrogen contains hydrogen and oxygen (such as 66% hydrogen and 33% oxygen). In other embodiment, the gas comprising hydrogen contains 100% hydrogen. The water tank 2 can be used to accommodate water and to receive the gas comprising hydrogen from the electrolytic module 1, and then the gas comprising hydrogen can be outputted from the electrolyte filter module 23. The electrolyte filter module 23 has a continuous upward sloping channel and comprises at least one of steel wool and polyester synthetic cotton. Therefore, the electrolyte in the gas comprising hydrogen can be filtered out through the electrolyte filter module 23, and the continuous upward sloping channel can block liquid which is contained in the gas comprising hydrogen. As shown in FIG. 2C and FIG. 2D, the integrated passageway device 3 comprises an upper cover 30 and a lower cover 31; a gas inlet passageway 35, a gas outlet passageway 36, and a gas communication passageway 37 are located between the upper cover and the lower cover. The lower cover 31 is an integral formed structure. Wherein, the "integrated formed structure" can be recognized as a structure formed by injection moulding, or a structure formed by welding and combining different components into one. In practice, as shown in FIG. 1, FIG. 2A to FIG. 2D, the integrated passageway device 3 is stacked above the humidification cup 4, and the humidification cup 4 is stacked above the water tank 2. Please refer to FIG. 3, FIG. 3 is a top view of the hydrogen generator E according to the embodiment of FIG. 2. The lower cover 31 has a space 320 configured for accommodating the condensate filter 5. The humidification cup 4 is stacked between the integrated passageway device 3 and the water tank 2 and is coupled to the lower cover 31. The condensate filter 5 is used to condense and filter the gas comprising hydrogen, and has a condensate passageway 50. In practice, the condensate filter 5 can be moveably embedded into the integrated passageway device 3 for easy replacement. The filter rod 60 can be used to filter the gas comprising hydrogen. The nebulizer 7 is embedded into the lower cover 31 and coupled to the gas outlet passageway 36 to receive the gas comprising hydrogen. The nebulizer 7 further generates atomized gas and mix the atomized gas with the gas comprising hydrogen to form healthy gas. The hydrogen water cup 8 can be used to accommodate drinking water and inject the gas comprising hydrogen into the drinking water to form hydrogen water. In practice, the hydrogen water cup 8 can be embedded into the frame 80 to be coupled (or directly connected) to the integrated passageway device 3. When the hydrogen water cup 8 is detached from the frame 80 and not coupled with the integrated passageway device 3, the electrolytic module 1 stops the operation. Wherein, the gas inlet passageway 35 and the gas outlet passageway 36 are selectively coupled to the hydrogen water cup 8, and the gas communication passageway 37 is selectively coupled to the gas inlet passageway 35 and the gas outlet passageway 36.

Therefore, the gas comprising hydrogen can be transferred among the humidification cup 4, the condensate filter 5, the filter rod 60, the nebulizer 7, and hydrogen water cup 8. In one embodiment, the humidification cup 4, the condensate filter 5, and the nebulizer 7 are directly coupled to the lower cover 31. Furthermore, the hydrogen water cup 8 can be directly coupled to the lower cover 31.

In one embodiment, the electrolytic module 1 can be accommodated in the water tank 2, and the electrolytic module 1 can receive water in the water tank 1 to electrolyze water for generating the gas comprising hydrogen. After the electrolytic module 1 electrolyzing water, the electrolytic module 1 directly generates the gas comprising hydrogen in the water tank 2. In practice, the outer layer of the water tank 2 has a honeycomb structure 24 for increasing the rigidity of the water tank 2 to prevent the water tank 2 from being deformed by the gas comprising hydrogen. Besides, since the honeycomb structure 24 increases the rigidity of the water tank 2, the gas comprising hydrogen tends to move to the communicating room 41 instead of staying in the water tank 2.

The humidification cup 4 comprises a humidification room 40, a communicating room 41, and a filter room 42. The humidification room 40 accommodates supplementary water to humidify the gas comprising hydrogen. The communicating room 41 is used to couple the water tank 2 with the integrated passageway device 3 for the gas comprising hydrogen to flow into the condensate passageway 50. In this embodiment, the electrolyte filter module 23 is accommodated in the communicating room 41 for filtering the gas comprising hydrogen before the gas comprising hydrogen passes into the condensate passageway 50 through the communicating room 41. The filter room 42 can be used to accommodate the filter rod 60 for the filter rod 60 to filter the gas comprising hydrogen flowing through the filter room 42. Wherein, the humidification room 40, the communicating room 41, and the filter room 42 are isolated from each other. Besides, the lower cover 31 of the integrated passage device 3 further has a condensate channel 330, a humidification channel 331, and a filter channel 332. The condensate channel 330 is used to couple the water tank 2 with the condensate filter 5 through the communicating room 41. The humidification channel 331 is used to couple the condensate passageway 50 with the humidification room 40. The filter channel 332 is used to couple the humidification room 40 with the filter room 42, and the filter room 42 couples to the gas inlet passageway 35 to output the filtered gas comprising hydrogen.

Figure 4:
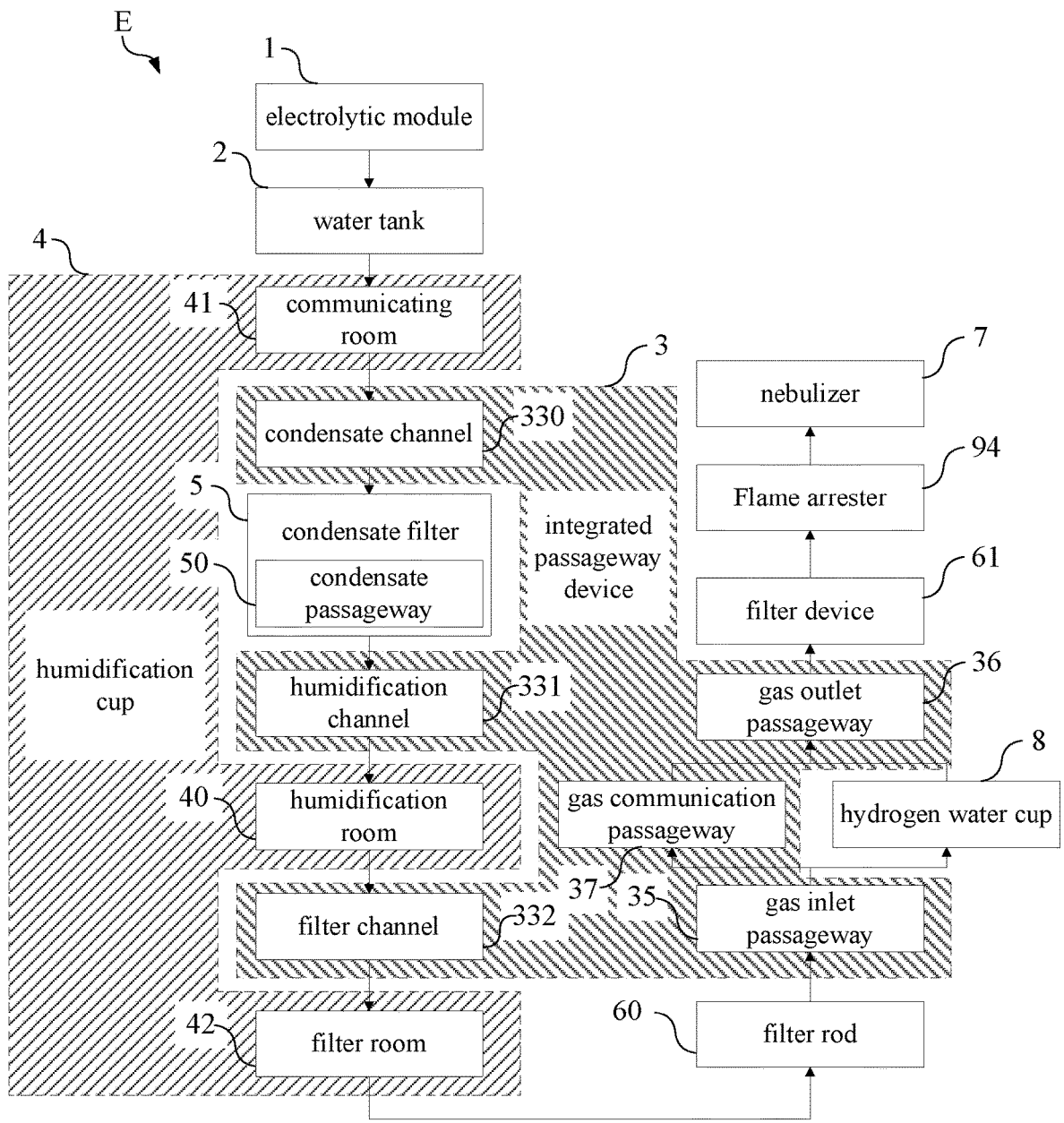
FIG. 4 is a schematic diagram illustrating the flow direction of the gas comprising hydrogen in the hydrogen generator according to the embodiment of FIG. 1.

In detail, the hydrogen generator E of the present invention has a gas path as shown in FIG. 1 through stacking and fitting the integrated flow channel device 3 and other components, so that the gas comprising hydrogen can flow therein. To illustrate the flow direction of the gas comprising hydrogen more clearly, please refer to FIG. 4. FIG. 4 is a schematic diagram illustrating the flow direction of the gas comprising hydrogen in the hydrogen generator E according to the embodiment of FIG. 1. As shown in FIG. 4, the electrolytic module 1 electrolyzes water to generate gas comprising hydrogen, and the gas comprising hydrogen is outputted and accommodated into the water tank 2 because the electrolytic module 1 is configured in the water tank 2. Next, the gas comprising hydrogen flows through the communicating room 41 of the humidification cup 4, the condensate channel 330 of the integrated passageway device 3, the condensate passageway 50 of the condensate filter 5, the humidification channel 331 of the integrated passageway device 3, the humidification room 40 of the humidification cup, the filter channel 332 of the integrated passageway device 3, the filter room 41 of the humidification cup 4, the filter rod 60, the gas inlet passageway 35 of the integrated passageway device 3, the gas outlet passageway 36 of the integrated passageway device 3, a flame arrester 94, and the nebulizer 7 in sequence. Wherein, the gas comprising hydrogen between the gas inlet passageway 65 and the gas outlet passageway 36 can selectively flow through the hydrogen water cup 8 or the gas communication passageway 37 of the integrated passageway device 3. However, it should be noted that the above-mentioned flow direction of the gas comprising hydrogen is one of the embodiments of the hydrogen generator E of the present invention, and those skilled in the art can adjust the arrangement order of each element based on their requirements.

In one embodiment, the hydrogen generator E further comprises a filter device 61 configured to filter microorganisms in the gas comprising hydrogen or to kill bacteria in the gas comprising hydrogen. The filter device 61 can contain at least one of activated carbon, nano-silver sputtering, polyethylene terephthalate (PET), or polypropylene (PP) fiber cloth. The bacterial types may include *Staphylococcus aureus, Escherichia coli, Pseudomonas aeruginosa*, drug-resistant *Staphylococcus aureus*, etc. It should be noted that those skilled in the art can add multiple filter devices 61 and adjust their setting positions according to their requirements, but it is not limited to this. The filter device 61 can be arranged before the flame arrester 94 (as shown in FIG. 4), or be arranged in the nebulizer 7 or the outlet of the nebulizer 7 as a replacement unit.

In one embodiment, the flame arrester 94 comprises at least one of a metal mesh filter core and a corrugated filter core. The metal mesh filter core can be a structure composed of multi-layer stainless steel mesh or copper mesh, with a diameter of 0.23 to 0.315 mm. The corrugated filter core can be supported by stainless steel, cupro-nickel alloy, aluminum, or aluminum alloy to prevent the violent flame of deflagration and withstand the corresponding mechanical and thermal effects. The flame arrester 94 is used to block the flame from flowing through the flame arrester 94, thereby isolating two spaces from each other. Therefore, the flame arrester 94 can prevent the fire from spreading from one side to the other side of the flame arrester 94, thereby preventing the fire from spreading through the gas channel and causing an explosion. In one embodiment, the flame arrester 94 is configured between the nebulizer 7 and the gas outlet passageway 36. In addition to use the flame arrester 94, the hydrogen generator E of the present invention can also use the supplementary water in the humidification room 40 and the water in the water tank 2 to achieve multi-zone fire prevention and prevent fire from spreading. In details, the hydrogen generator E can be divided into three regions (the water tank 2 to the humidification room 40, the humidification room 40 to the flame arrester 94, and the flame arrester 94 to the nebulizer 7 (even to the user end)) by water (supplementary water and electrolyzed water). When a flame enters into the hydrogen generator E from the nebulizer 7 side, the flame will be blocked by the flame arrester 94. When a flame occurs in the gas channel between the humidification room 40 and the flame arrester 94, the supplementary water in the humidification room 40 and the flame arrester 94 will block the flame. When a flame occurs in the electrolysis module 1, the electrolyzed water in the water tank 2 will block the flame. In addition to achieving multi-region fire protection, multi-step fire protection also can be achieved. For example, if the flame arrester 94 cannot block a flame when the flame enters into the hydrogen generator E from the nebulizer 7 side, the supplementary water in the humidification room 40 can be used as a second flame arrest. Therefore, the use safety of the hydrogen generator E can be sufficiently improved. It should be noted that those skilled in the art can add a plurality of flame arresters 94 and adjust their setting positions to achieve more interval-type and more stage-type fire arresters according to their requirements, which is not limited to this.

Please refer to FIG. 3 again. As shown in FIG. 3, in order to clearly show the inside of the condensate filter 5, the gas inlet passageway 35, the gas outlet passageway 36, and the gas communication passageway 37, the cover of the condensation filter 5 and the upper cover 30 of the integrated passageway device 3 are hidden. The relative positions of the filter room 42, the gas inlet passageway 35, the gas communication passageway 37, the hydrogen water cup 8, the gas outlet passageway 36, and the nebulizer 7 can be clearly recognized in FIG. 3. The flow direction of the gas comprising hydrogen is indicated by solid arrows and dashed arrows. Under the normal operation mode, the gas comprising hydrogen arrives at the nebulizer 7 sequentially from the filter room 42, the gas inlet passageway 35, the hydrogen water cup 8, and the gas outlet passageway 36. In the state which the diversion signal is generated, the gas comprising hydrogen enters into the gas outlet passageway 36 from the gas inlet passageway 35 through the gas communication passageway 37 in the direction of the dotted arrow.

The condensate passageway 50 of the condensate filter 5 is formed by a plurality of spacers 51. The condensate passageway 50 can accommodate the filter pad 52, and the filter pad 52 can be at least one of steel wool and polyester synthetic cotton. The filter pad 52 is used to filter impurities in the gas comprising hydrogen, such as electrolyte or alkali mist. A cooling fin (not shown in figures) can be provided above the filter pad 52. When the filter pad 52 is closely attached to the cooling fin, the filter pad 52 can transfer the thermal energy in the gas comprising hydrogen to the outside, thereby enhancing the condensation effect. In practice, the filter pad 52 can be an integrally formed structure, and the filter pad 52 has a plurality of holes corresponding to the positions of the spacers 51. When the filter pad 52 is coupled to the condensate passageway 50, the filter pad 52 can be directly coupled to the corresponding spacer to improve the tightness between the condensate passageway 50 and the filter pad 52. Therefore, it can be ensured that the gas comprising hydrogen flowing through the condensate passageway 50 can be filtered and condensed. The filter pad 52 also can be a separate structure composed of multiple pieces of fiber cotton, or can be a combination structure composed of at least one piece of steel wool and at least one piece of fiber cotton.

The lower cover 31 of the integrated passageway device 3 has a movable flip structure 310 for forming a side structure surrounding the space 320. The condensate filter 5 is placed in the space 320 through the flip structure 310, so that the condensate filter 5 can be selectively engaged with the lower cover 31. Therefore, the user can easily replace the condensate filter 5 located in the space 320 by opening and closing the flip structure 310.

Figure 5A:
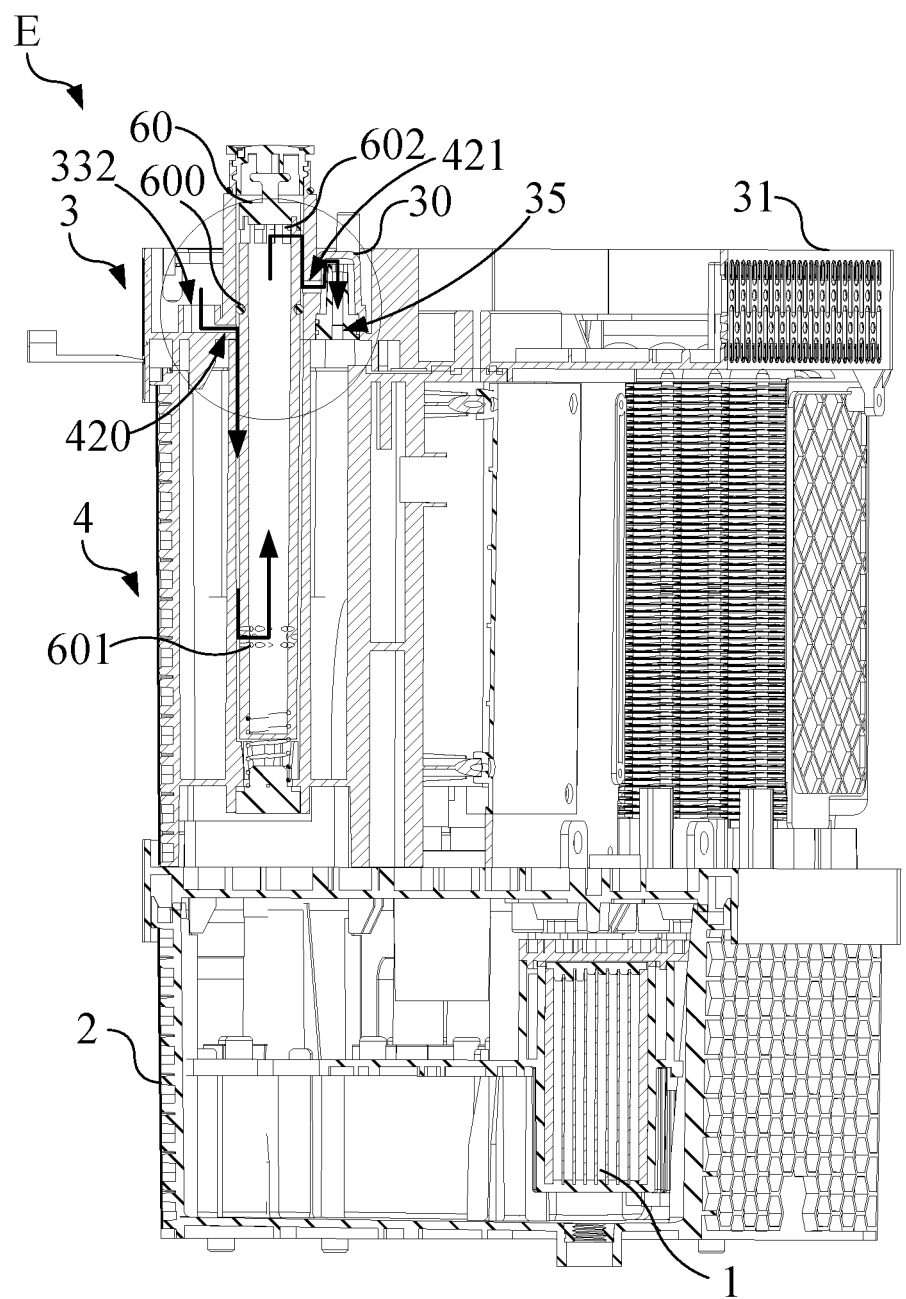
FIG. 5A is a cross-sectional view of the hydrogen generator along the section line A-A' according to the embodiment of FIG. 3.
Figure 5B:
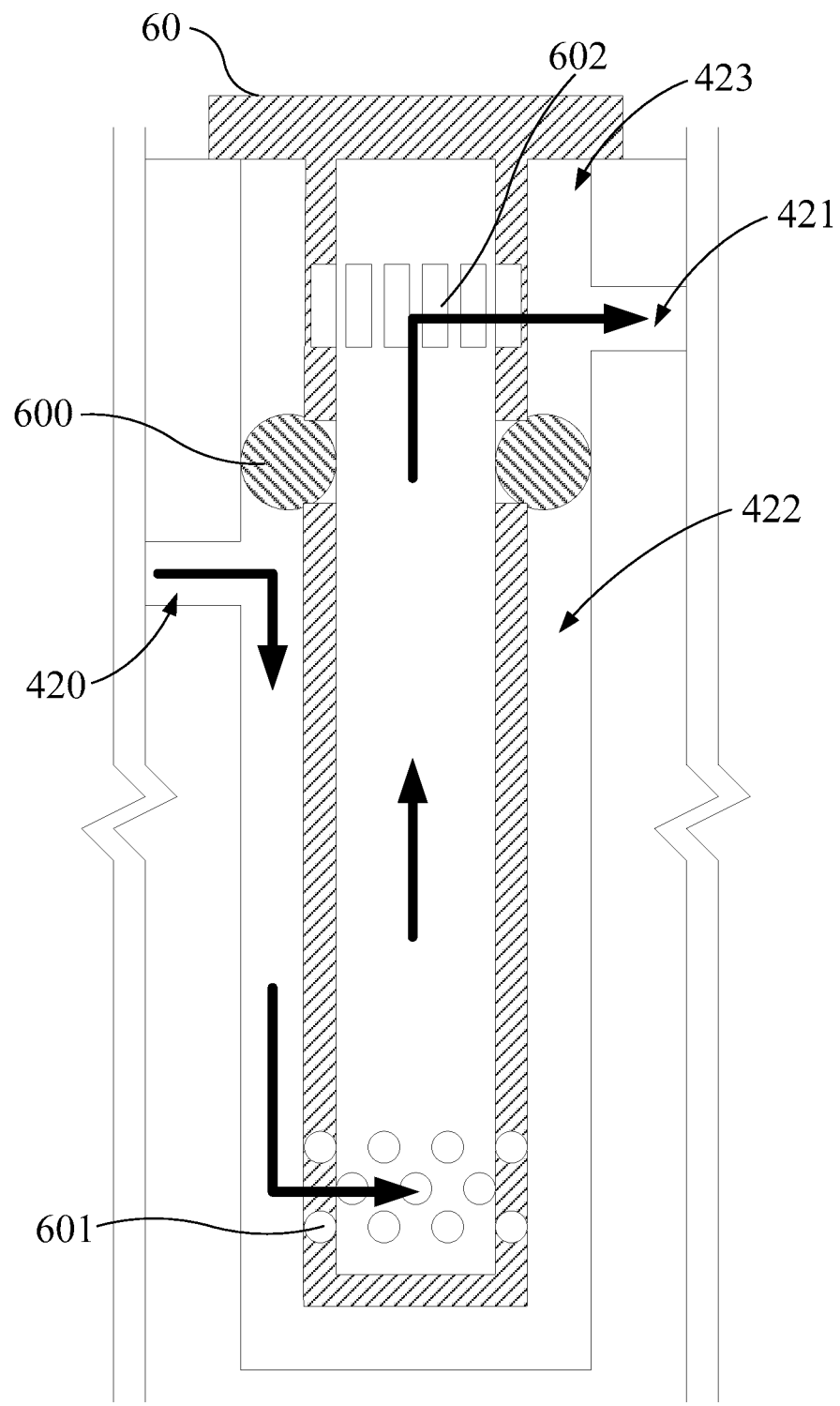
FIG. 5B is a schematic diagram illustrating the filter room and the filter rod of the hydrogen generator according to the embodiment of FIG. 5A.
Figure 6:
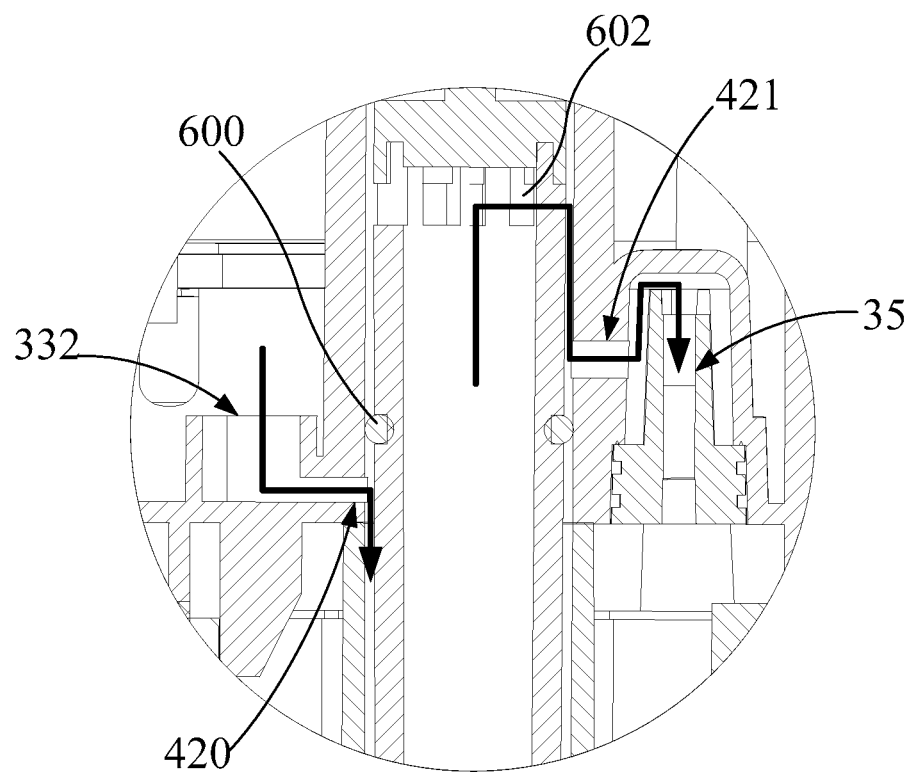
FIG. 6 is a partially enlarged schematic view of the circled portion of the hydrogen generator according to the embodiment of FIG. 5A.

For clearly understanding the relative positions and arrangements of the filter rod 60 and the filter room 42, please refer to FIG. 5A to FIG. 6. FIG. 5A is a cross-sectional view of the hydrogen generator E along the section line A-A' according to the embodiment of FIG. 3. FIG. 5B is a schematic diagram illustrating the filter room 42 and the filter rod 60 of the hydrogen generator E according to the embodiment of FIG. 5A. FIG. 6 is a partially enlarged schematic view of the circled portion of the hydrogen generator E according to the embodiment of FIG. 5A. As shown in FIG. 5A to FIG. 6, the filter room 42 has a filter room inlet 420 and a filter room outlet 421. The filter room inlet 420 is coupled to the filter channel 332, and the filter room outlet 421 is coupled to the gas inlet passageway 35. The filter rod 60 comprises a gas barrier ring 600, and has a plurality of filter inlet 601 and a plurality of filter outlet 602. The gas barrier ring 600 is located on the outside of the filter rod 60 and configured to divide the filter room 42 into a pre-filter space 422 and a filtered space 423. The pre-filter space 422 is coupled to the filter room inlet 420 and the filter inlet 601, and the filtered space 423 is coupled to the filter room outlet 602 and the filter outlet 421. When the gas comprising hydrogen flows into the filter room 42 from the filter channel 332, the gas comprising hydrogen will flow through the filter room inlet 420 and the pre-filter space 422 in sequence. Next, the gas comprising hydrogen will flow into the filter rod 60 through the filter inlet 601 and flow out through the filter outlet 602. Then, the gas comprising hydrogen flows into the gas inlet passageway 35 through the filtered space 423 and the filter room outlet 421. That is to say, the filter rod 60 can form a flow channel based on the structural design between the filter rod 60 and the filter room 42 without additional pipeline connection, thereby realizing the effective use of space and improving the air tightness of the flow channel.

Figure 7:
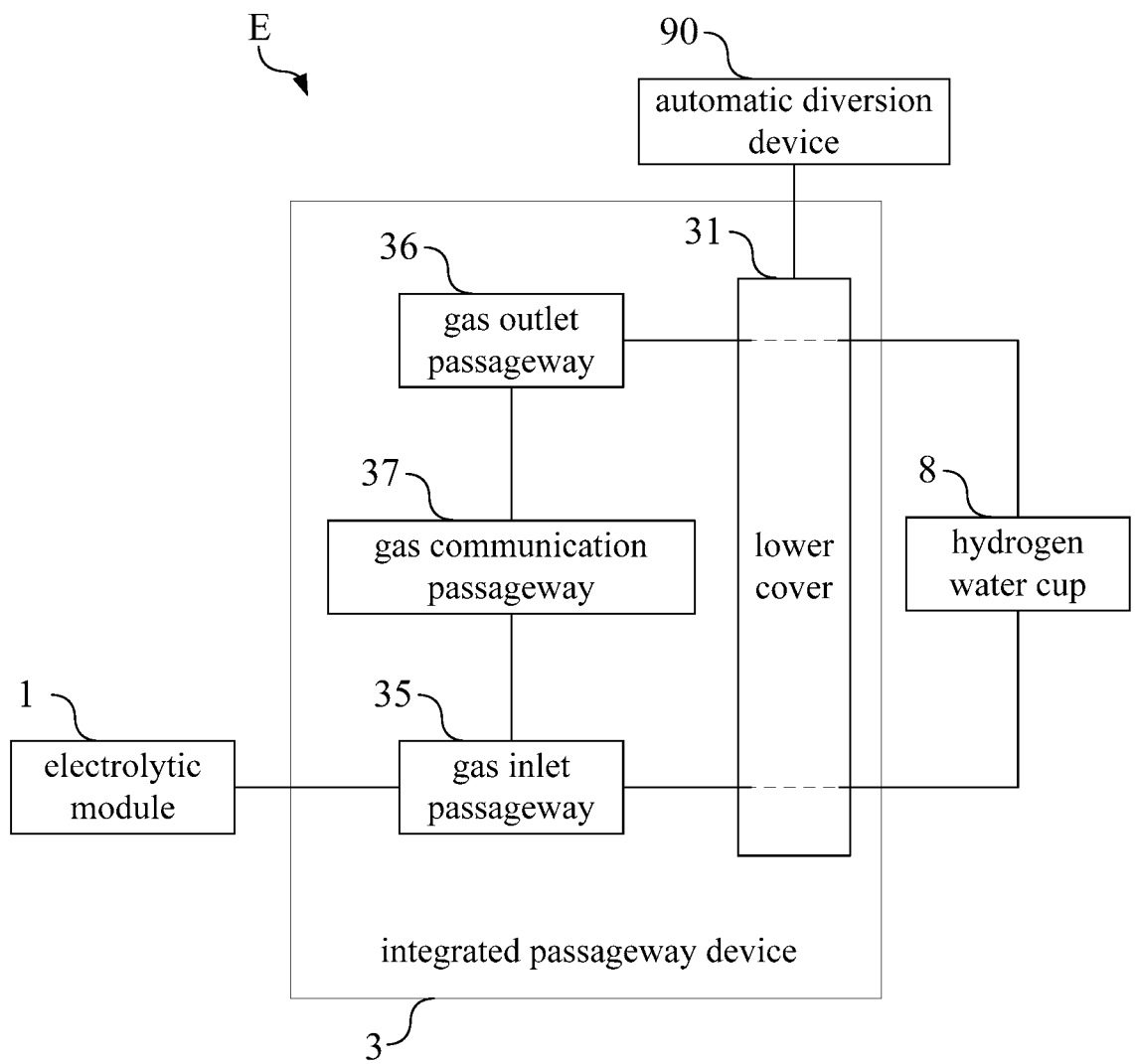
FIG. 7 is a functional block diagram illustrating an automatic diversion device of a hydrogen generator capable of selectively adjusting gas flow direction according to an embodiment of the present invention.

Please refer to FIG. 7. FIG. 7 is a functional block diagram illustrating an automatic diversion device 90 of a hydrogen generator capable of selectively adjusting gas flow direction E according to an embodiment of the present invention. The hydrogen generator capable of selectively adjusting gas flow direction E of the present invention further comprises an automatic diversion device 90. The automatic diversion device 90 is configured to selectively connect the gas inlet passageway 35, the hydrogen water cup 8, and the gas outlet passageway 36, or configured to selectively connect the gas inlet passageway 35, the gas communication passageway 37, and the gas outlet passageway 36. In practice, the automatic diversion device 90 is operated by a solenoid valve.

Figure 8A:
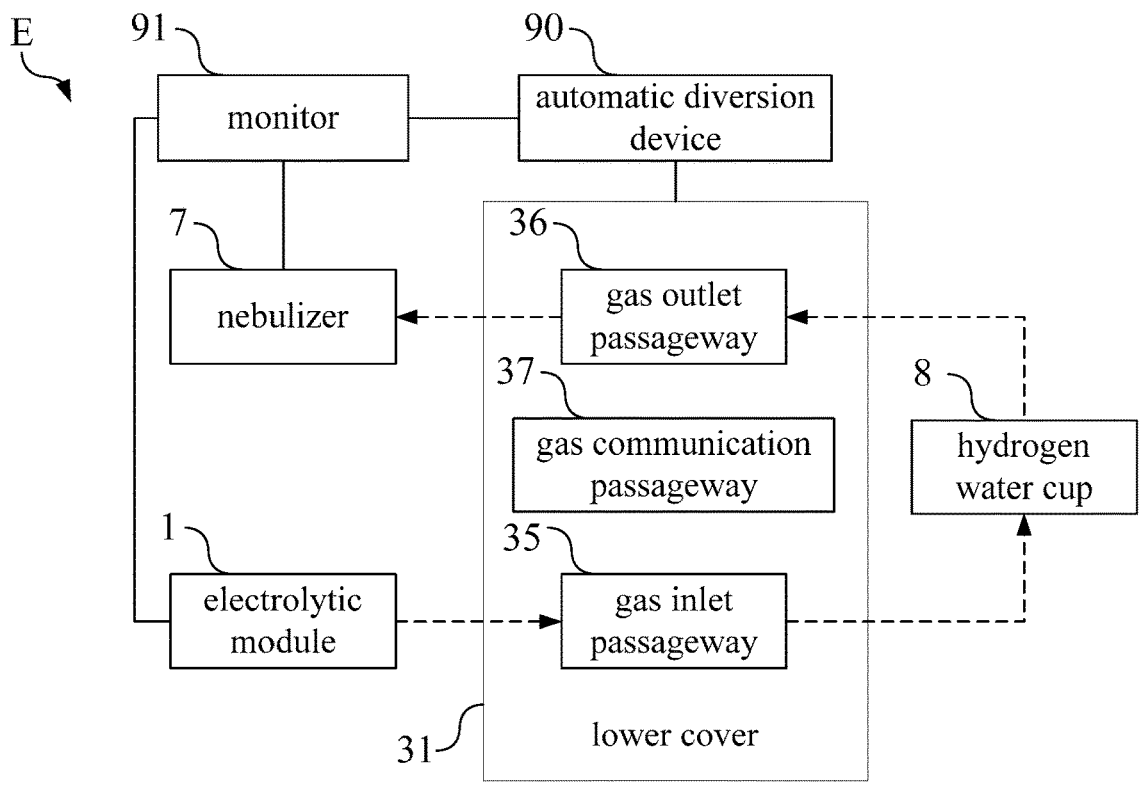
FIG. 8A is a schematic diagram of the use state of the hydrogen generator under normal operation according to the embodiment of FIG. 7.
Figure 8B:
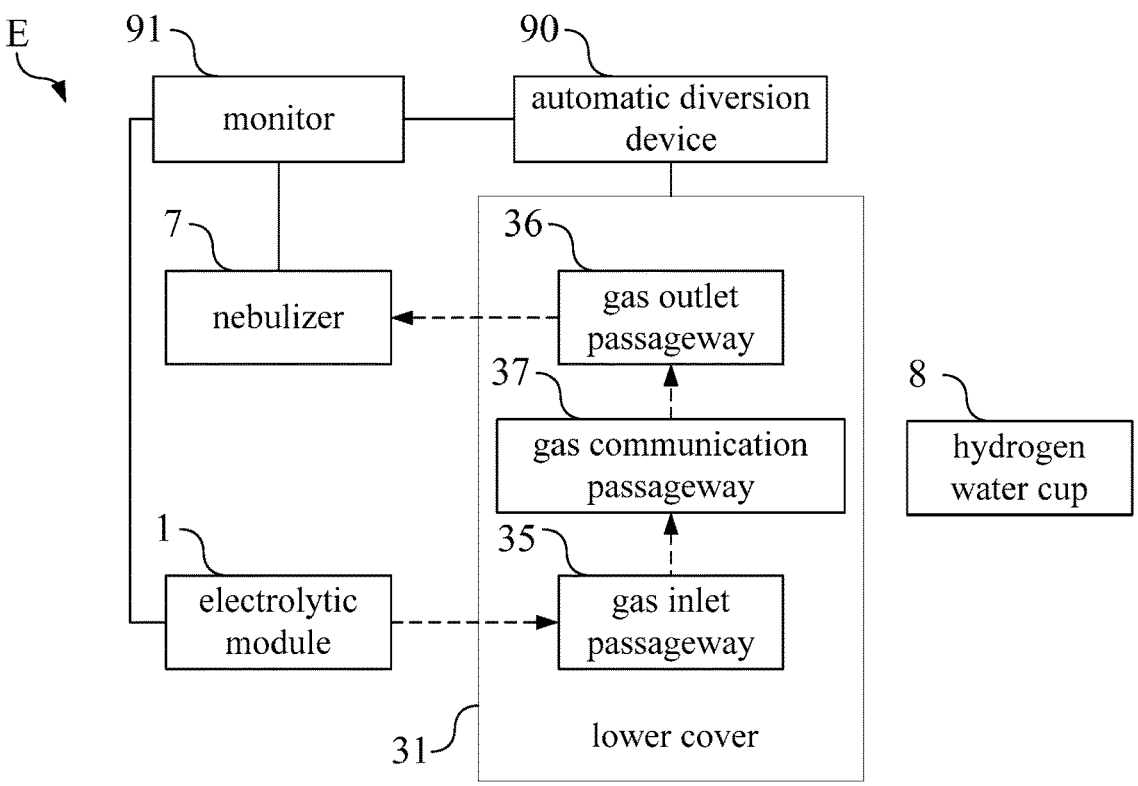
FIG. 8B is a schematic diagram of the use state of the hydrogen generator after receiving the diversion signal according to the embodiment of FIG. 7.

Please refer to FIG. 8A and FIG. 8B. FIG. 8A is a schematic diagram of the use state of the hydrogen generator E under normal operation according to the embodiment of FIG. 7. FIG. 8B is a schematic diagram of the use state of the hydrogen generator E after receiving the diversion signal according to the embodiment of FIG. 7. As shown in FIG. 7, FIG. 8A, and FIG. 8B, the gas inlet passageway 35, the gas communication passageway 37, and the gas outlet passageway 36 are all located on the lower cover 31. The automatic diversion device 90 is coupled to the lower cover 31, and the automatic diversion device 90 is configured to switch flow channel based on a diversion signal of a monitor 91 to adjust the flow direction of the gas comprising hydrogen. As shown in FIG. 8A, under normal operation, the monitor 91 can control the automatic diversion device 90 to make the hydrogen water cup 8 to connect to the gas inlet passageway 35 and the gas outlet passageway 36. That is, the gas inlet passageway 35 is coupled to the gas outlet passageway 36 through the hydrogen water cup 8. Therefore, the gas comprising hydrogen generated from the electrolytic module 1 flows into the nebulizer 7 through the gas inlet passageway 35, the hydrogen water cup 8, and the gas outlet passageway 36 in sequence (indicated by dashed arrows in the figure). The gas comprising hydrogen will be injected into the drinking water to form the hydrogen water when the gas comprising hydrogen enters into the hydrogen water cup 8. Then, the gas comprising hydrogen that is not dissolved in the drinking water will be discharged from the hydrogen water cup 8 and flow to the nebulizer 7 through the gas outlet passageway 36. As shown in FIG. 8B, under another mode, the automatic diversion device 90 connects the gas inlet passageway 35, the gas communication passageway 37, and the gas outlet passageway 36, and isolates the hydrogen water cup 8 from the gas inlet passageway 35 and the gas outlet passageway 36 based on the diversion signal from the monitor 91. At this moment, the gas inlet passageway 35 is connected with the gas outlet passageway 36 through the gas communication passageway 37, so that the gas comprising hydrogen generated by the electrolytic module 1 flows into the nebulizer 7 through the gas inlet passageway 35, the gas communication passageway 37 and the gas outlet passageway 36 in sequence (indicated by dashed arrows in the figure). In one embodiment, the gas comprising hydrogen is transferred among the humidification cup 4, the condensate filter 5, the filter rod 60, the nebulizer 7, the hydrogen water cup 8, and the automatic diversion device 90 by the integrated passageway device 3. Wherein, the humidification cup 4, the condensate filter 5, the nebulizer 7, and the automatic diversion device 90 are directly coupled to the lower cover 31.

In practice, a low-frequency sound will be produced when the hydrogen water cup 8 injects the gas comprising hydrogen into the drinking water or when the nebulizer 7 vibrates to generate the healthy gas. The low-frequency sound may not be obvious in daily life during the day, but in the dead of night, this low-frequency sound may affect the user's sleep quality. Therefore, the monitor 91 of the hydrogen generator E of the present invention is coupled to the automatic diversion device 90 to selectively generate a diversion signal to control the automatic diversion device 90. At night, the user can adjust the hydrogen generator E into night mode. At this moment, the monitor 91 will send a diversion signal to control the automatic diversion device 90 to make the gas communication passageway 37 to be connected with the gas inlet passageway 35 and the gas outlet passageway 36, so that the gas comprising hydrogen will not flow into the hydrogen water cup 8. In addition, under the night mode, the monitor 91 can also turn off the nebulizer 7 to stop generating atomized gas, so as to avoid the generation of low-frequency sound. In another embodiment, when the night mode is canceled, the monitor 91 will control the automatic diversion device 90 to make the gas comprising hydrogen flow through the hydrogen water cup 8, and control the nebulizer 7 to generate atomized gas.

Figure 9:
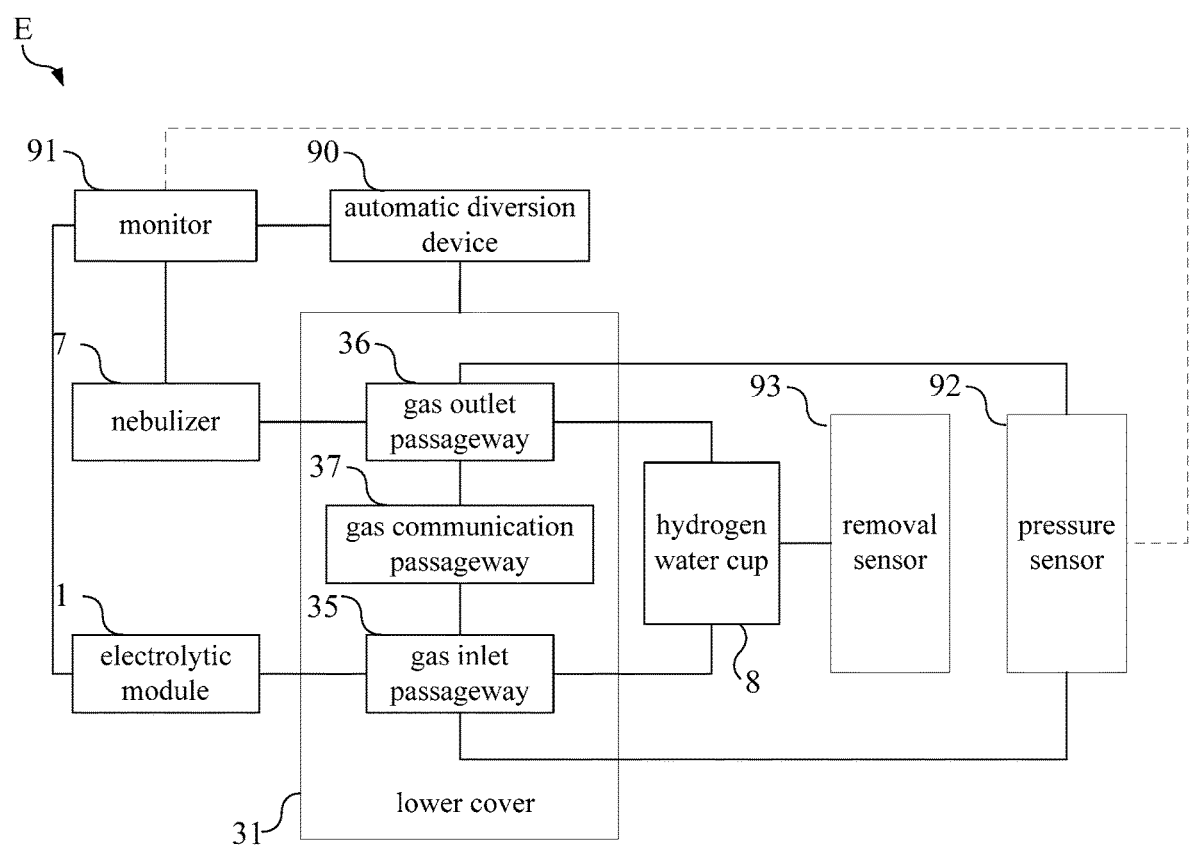
FIG. 9 is a functional block diagram illustrating a derivative embodiment of the hydrogen generator according to the embodiment of FIG.

When the hydrogen generator E is used by the user, the breathing circuit used to connect the hydrogen generator E to provide the user's inhalation may be compressed due to the change of the user's posture, thereby hindering the normal output of the gas comprising hydrogen from the hydrogen generator to the breathing circuit. In order to avoid the explosion or damage of the machine due to the excessive gas comprising hydrogen in the flow channel of the gas generator E caused by the abnormal output of the gas comprising hydrogen, the hydrogen generator E of the present invention further comprises a pressure sensor 92 to solve this problem. Please refer to FIG. 9. FIG. 9 is a functional block diagram illustrating a derivative embodiment of the hydrogen generator E according to the embodiment of FIG. 7. As shown in FIG. 9, the pressure sensor 92 is coupled to at least one of the gas inlet passageway 35 and the gas outlet passageway 36. The pressure sensor 92 is used to sense a gas pressure in at least one of the gas inlet passageway 35 and the gas outlet passageway 36 which the pressure sensor 92 is configure on, and to generate a pressure sensing signal. The monitor 91 is coupled to the pressure sensor 92 for operating the electrolytic module 1 according to the pressure sensing signal. In practice, when the user compresses the breathing circuit so that the gas comprising hydrogen in the gas flow channel cannot flow out of the hydrogen generator E normally, the gas pressure in at least one of the gas inlet passageway 35 and the gas outlet passageway 36 will rise. When the pressure sensor 92 senses an increase in gas pressure at the detected location, the pressure sensor 92 will generate a pressure sensing signal to allow the monitor 91 to control the electrolytic module 1. The monitor 91 will control the electrolytic module 1 to stop the production of the gas comprising hydrogen, so as to prevent the hydrogen generator E from being exploded or damaged due to the excessive amount of the gas comprising hydrogen in the gas flow channel to inflate elements. In addition, elements that are expanded by the gas comprising hydrogen will also cause gas leakage problems during the operation of the hydrogen generator E in the future.

The pressure sensor 92 can not only detect the pressure change caused by the user's pressing, but also detect whether the gas flow channel in the hydrogen generator E is unobstructed. Since the flame arrester 94, the filter pad 52, and the filter rod 60 in the hydrogen generator E will be gradually blocked due to long-term use, the gas pressure in the gas flow channel will gradually increase. Therefore, the hydrogen generator E can detect whether the internal parts are normal through the pressure sensor 92, and remind the user that the parts need to be replaced.

In a specific embodiment, the pressure sensor 92 can also send a pressure sensing signal containing a pressure detection value within a fixed time interval, and the monitor 91 is configured to monitor the change of the pressure sensing signal. If the pressure change is abnormal (such as the pressure detection value exceeds the upper threshold or falls below the lower threshold, or the pressure value change slope is too large), the monitor 91 will stop the operation of the electrolytic module 1 or increase the output amount of the gas comprising hydrogen generated by the electrolytic module 1. If the breathing circuit is unobstructed due to the fact that the user changes his posture, the monitor 91 can also return the hydrogen generator E into a normal state according to the pressure sensing signal (for example, the pressure detection value returns to a value between the upper threshold and the lower threshold, or the pressure value change slope returns to a normal range), the monitor 91 will restart the electrolytic module 1 to generate the gas comprising hydrogen. In another specific embodiment, the hydrogen generator E further comprises a pressure relief device. When the monitor 91 stops the operation of the electrolytic module 1, the pressure relief device will be activated at the same time to release the pressure in the gas flow channel to avoid equipment damage and danger.

Since the hydrogen generator E of the present invention has the hydrogen water cup 8, the gas comprising hydrogen may flow out from the coupling interface between the hydrogen water cup 8 and the lower cover 31 when the hydrogen water cup 8 is decoupled from the lower cover 31, thereby interrupting the connection among the gas inlet passageway 35, the hydrogen water cup 8, and the gas outlet passageway 36. Therefore, the hydrogen generator E of the present invention further comprises a removal sensor 93 coupled to the hydrogen water cup 8 to solve above problems. When the hydrogen water cup 8 is decoupled from the lower cover 31, the removal sensor 93 generates a second diversion signal to allow the gas comprising hydrogen to flow to the gas outlet passageway 36 through the gas communication passageway 37 instead of the hydrogen water cup 8, thereby solving the problem that the gas flow channel is interrupted.

Figure 10:
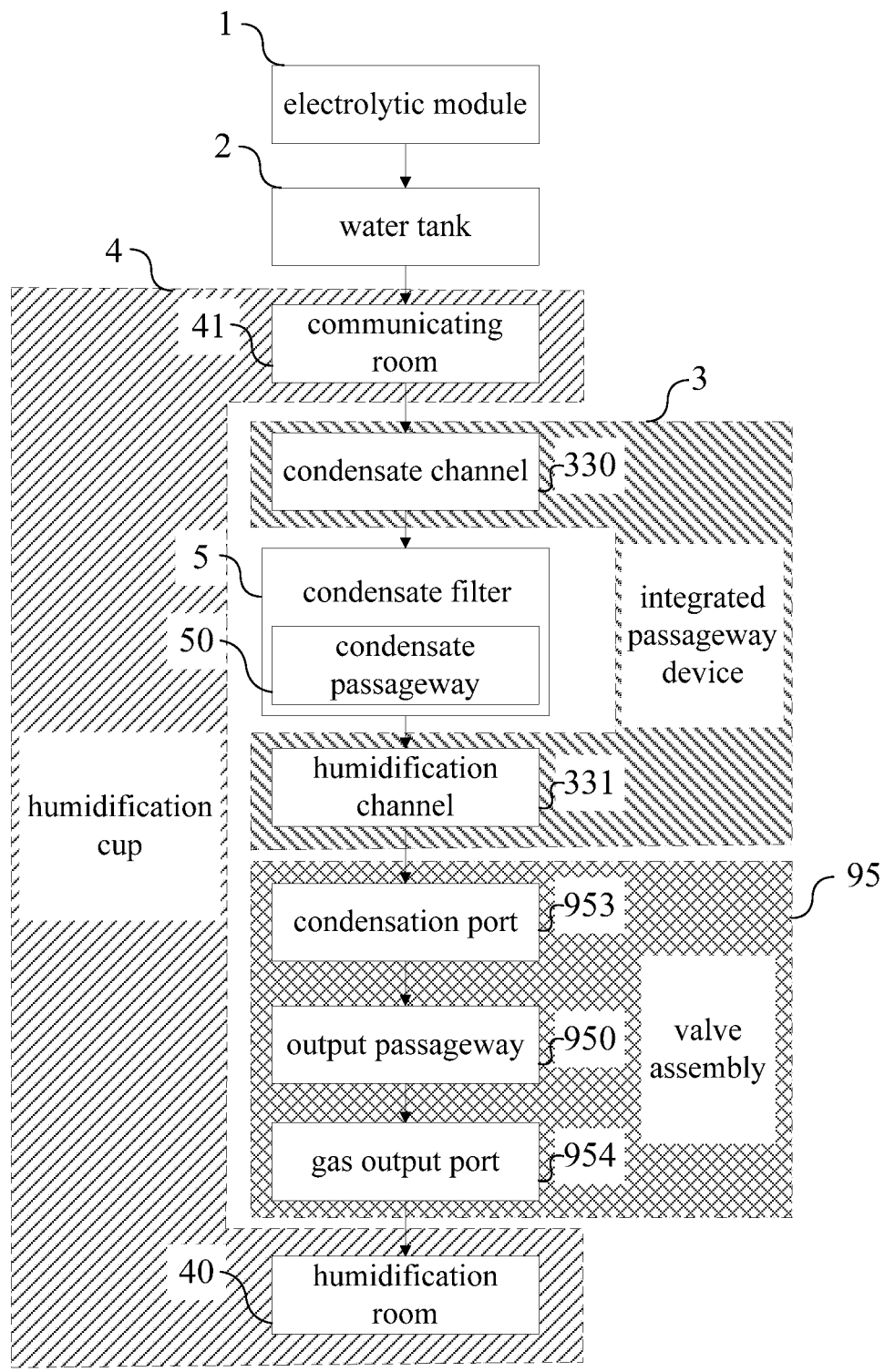
FIG. 10 is a functional block diagram illustrating a valve assembly of the hydrogen generator capable of selectively adjusting gas flow direction according to an embodiment of the present invention.
Figure 11:
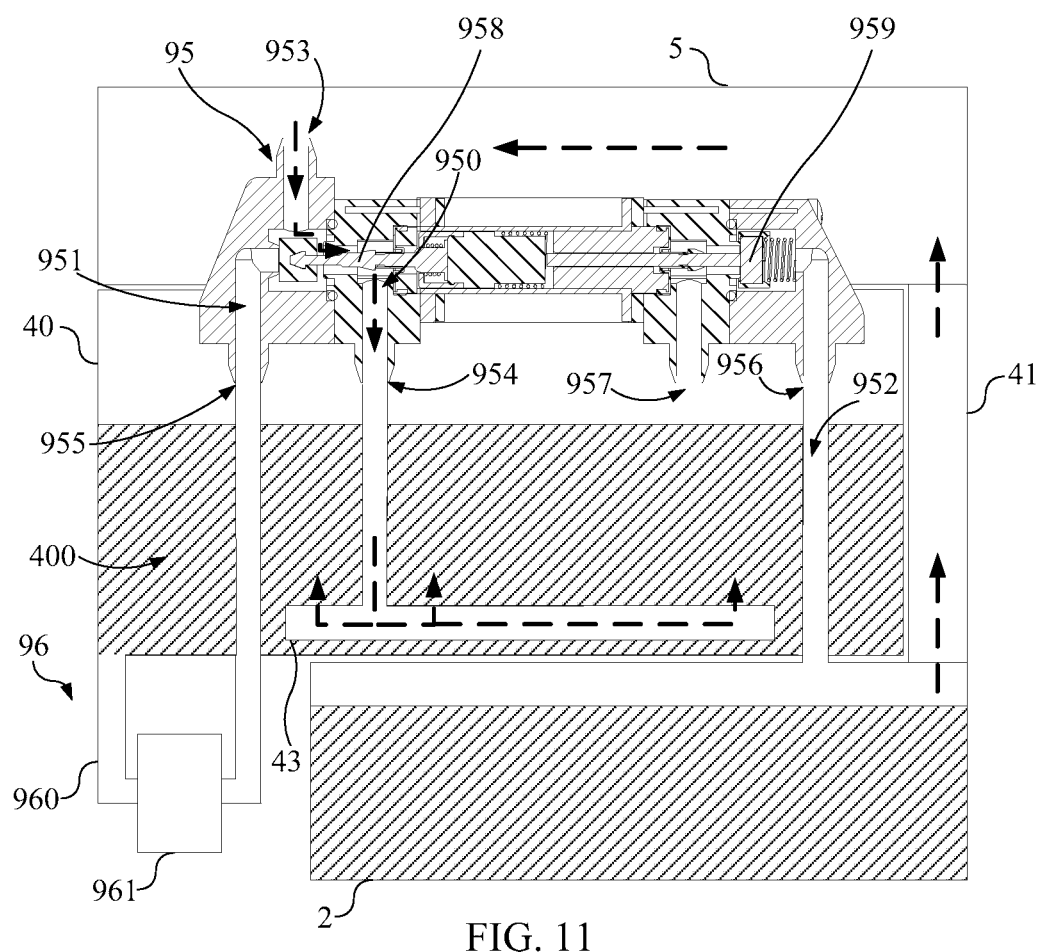
FIG. 11 is a schematic diagram of the use state of the valve assembly of the hydrogen generator according to the embodiment of FIG. 10.
Figure 12:
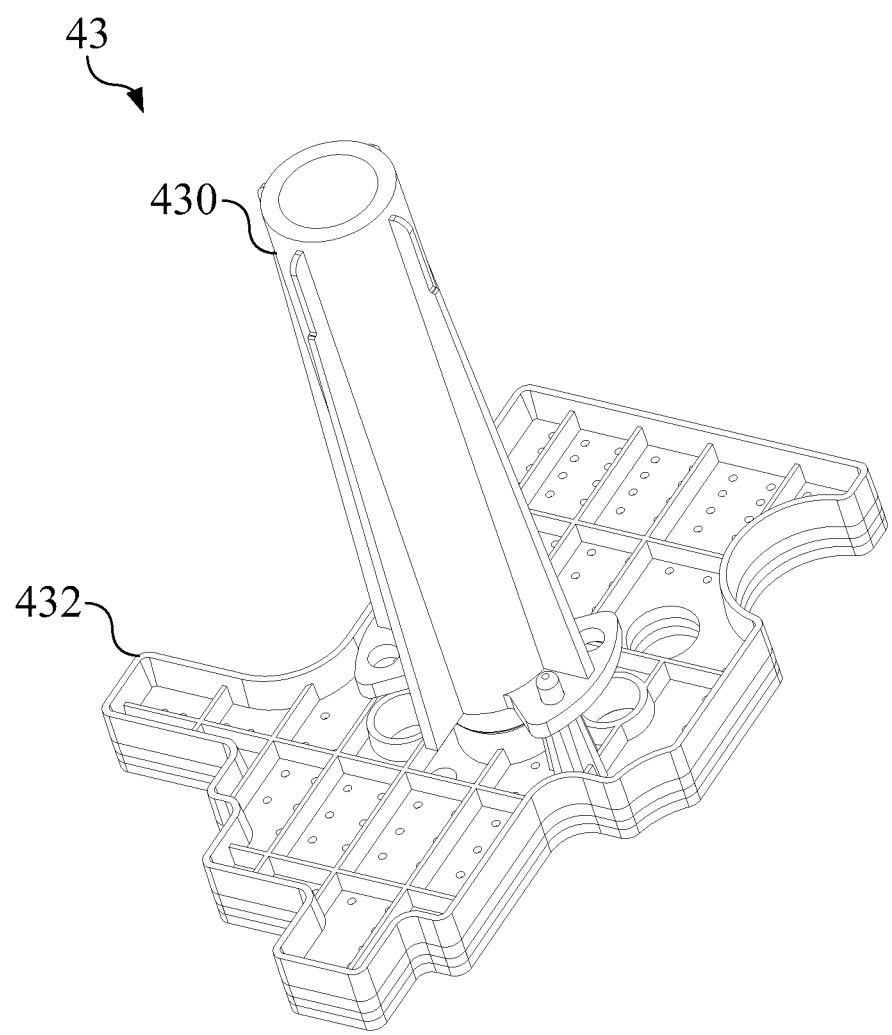
FIG. 12 is an appearance diagram illustrating a fining device of the hydrogen generator capable of selectively adjusting gas flow direction according to an embodiment of the present invention.
Figure 13:
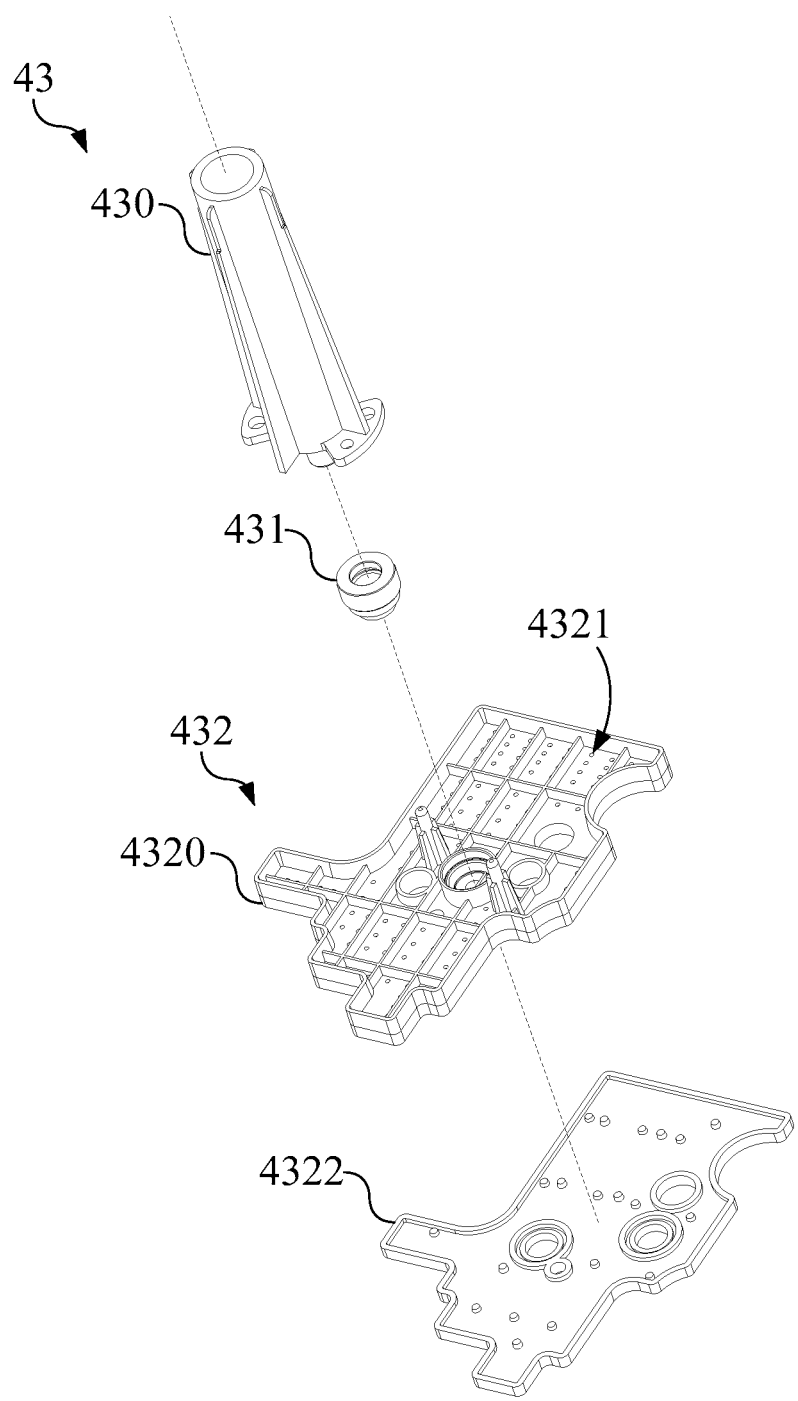
FIG. 13 is an exploded diagram illustrating the fining device according to the embodiment of FIG. 12.

In order to prolong the time for generating the gas comprising hydrogen, the hydrogen generator E of the present invention further comprises a valve assembly 95 and a water guide assembly 96. When the electrolyzed water is insufficient, the electrolyzed water can be replenished by the supplementary water accommodated in the humidification room 40 first. When the supplementary water in the humidification room 40 is also insufficient, the user can replenish the supplementary water into the humidification room 40 from the outside of the hydrogen generator E. In order to clearly describe the valve assembly 95 and the water guide assembly 96, a gas flow path for delivering gas comprising hydrogen and a water flow path for supplementing electrolyzed water will be described below, respectively. Please refer to FIG. 10 to FIG. 13. FIG. 10 is a functional block diagram illustrating a valve assembly 95 of the hydrogen generator capable of selectively adjusting gas flow direction E according to an embodiment of the present invention. FIG. 11 is a schematic diagram of the use state of the valve assembly 95 of the hydrogen generator E according to the embodiment of FIG. 10. FIG. 12 is an appearance diagram illustrating a fining device 43 of the hydrogen generator capable of selectively adjusting gas flow direction E according to an embodiment of the present invention. FIG. 13 is an exploded diagram illustrating the fining device 43 according to the embodiment of FIG. 12. As shown in FIG. 10 and FIG. 11, an output passageway 950 of the valve assembly 95 can be coupled to the condensate passageway 50 of the condensate filter 5 and the humidification room 40 of the humidification cup 4 to deliver the gas comprising hydrogen. In detail, the valve assembly 95 further has a condensation port 953 and a gas output port 954 which are coupled to the output passageway 950. The condensation port 963 is at least coupled to the condensate filter 5 and the gas output port 954 is at least coupled to the humidification cup 4, so that the gas comprising hydrogen is received by the condensation port 953 through the water tank 2, the communicating room 41, and the condensate filter 5, and is output to the humidification room 40 of the humidification cup 4 through the gas output port 954. Therefore, the gas comprising hydrogen is transferred among the humidification cup 4, the condensate filter 5, the filter rod 60, the nebulizer 7, the hydrogen water cup 8, the automatic diversion device 90, and the valve assembly 95 by the integrated passageway device 3. In one specific embodiment, the humidification cup 4, the condensate filter 5, the nebulizer 7, the automatic diversion device 90, and the valve assembly 95 are directly coupled to the lower cover 31.

As shown in FIG. 10 to FIG. 13, the humidification room 40 has a humidification space 400 for accommodating the supplementary water. The humidification room 40 further comprises a fining device 43, and the fining device 43 comprises a communicating column 430, a coupling unit 431, and a fining base 432. The communicating column 430 is coupled to the gas output port 954 and has a first fining channel. The fining base 432 is coupled to one end of the communicating column 430 away from the gas output port 954 through the coupling unit 431 and is immersed in the supplementary water. The fining base 432 further comprises a fining housing 4320 and a fining body 4322, wherein the fining housing 4320 is coupled to the fining body 4322 to form a second fining channel. The first fining channel is fluidly coupled to the second fining channel. Furthermore, the fining housing 4320 has a plurality of fining pores 4321 to couple the humidification space 400 and the second fining channel. Therefore, the gas comprising hydrogen flows from the gas output port 954, and flows through the first fining channel, the second fining channel, and the fining pores 4321, and finally flows into the humidification room 40 and then to be injected into the supplementary water to humidify the gas comprising hydrogen. In one embodiment, considering the junction of the first fining channel and the second fining channel as the center, the fining pores 4321 near the center have smaller diameters than the fining pores 4321 far from the center, and the fining pores 4321 far from the center have larger diameters than the fining pores 4321 far from the center. Therefore, the amount of the gas comprising hydrogen output from each fining pore 4321 can be uniform. In another embodiment, considering the junction of the first fining channel and the second fining channel as the center, the cross-sectional areas of the second fining channel near the center and the second fining channel far from the center are inconsistent. For example, the cross-sectional area of the second fining channel is not uniform but gradual, so the gas flow rate in the second fining channel is inconsistent. Therefore, the gas comprising hydrogen will not be output to the humidification room 40 in a specific area of the second fining channel, so that the amount of the gas comprising hydrogen can be distributed as uniformly as possible from each fining pore 4321 of the second fining channel.

Figure 14:
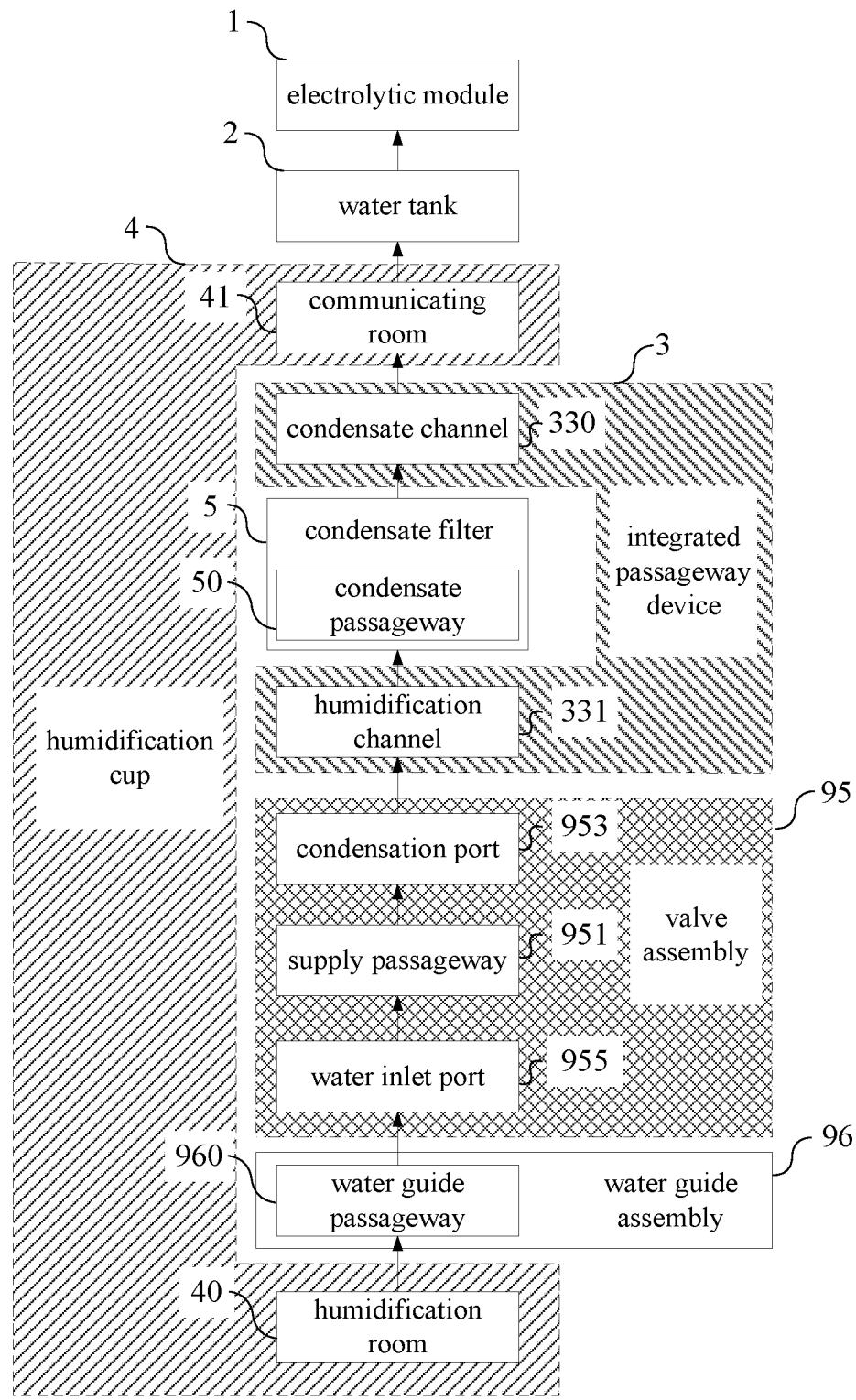
FIG. 14 is a functional block diagram illustrating a valve assembly of the hydrogen generator capable of selectively adjusting gas flow direction according to another embodiment of the present invention.
Figure 15:
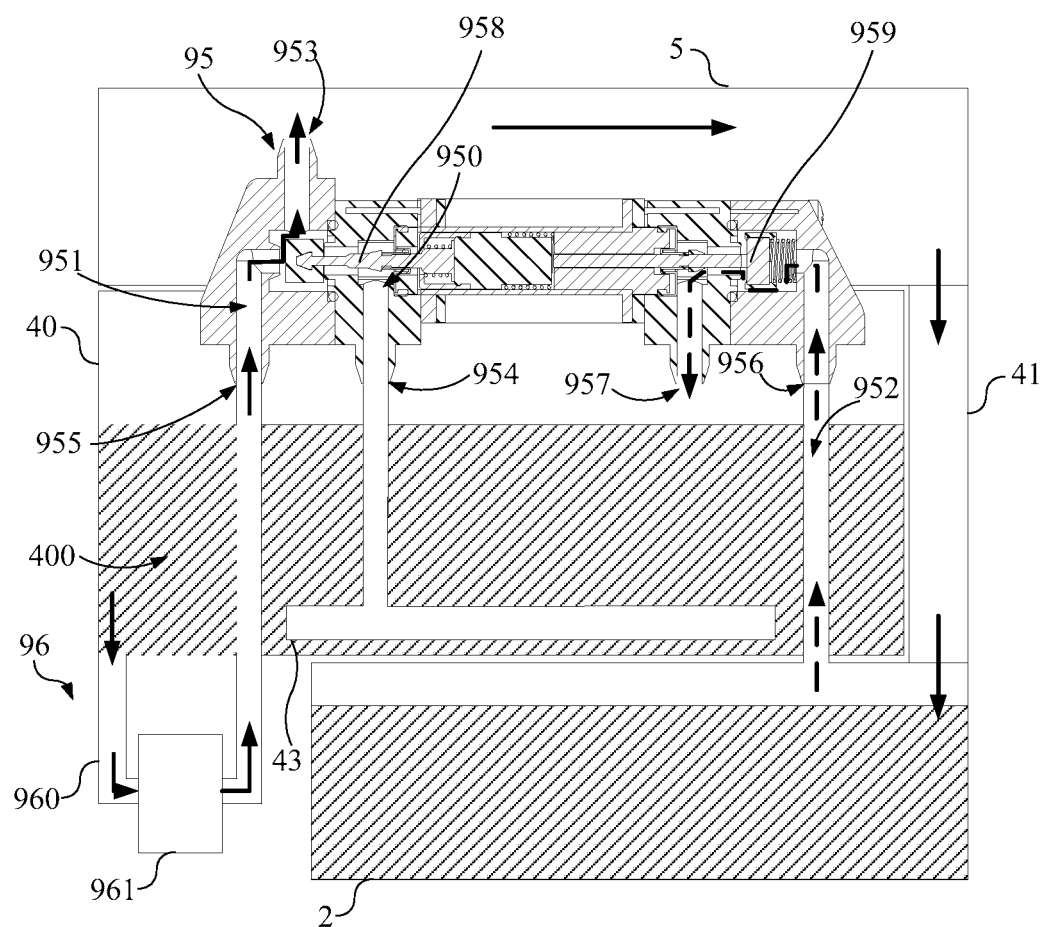
FIG. 15 is a schematic diagram of the use state of the valve assembly of the hydrogen generator according to the embodiment of FIG. 14.

Please refer to FIG. 14 and FIG. 15 for the water flow path. FIG. 14 is a functional block diagram illustrating a valve assembly 95 of the hydrogen generator capable of selectively adjusting gas flow direction E according to another embodiment of the present invention. FIG. 15 is a schematic diagram of the use state of the valve assembly 95 of the hydrogen generator E according to the embodiment of FIG. 14. As shown in FIG. 14 to FIG. 15, the valve assembly 95 further comprises a supply passageway 951 coupled to the humidification room 40 of the humidification cup 4 and the condensate passageway 50 of the condensate filter 5 to deliver the supplementary water. In detail, the valve assembly 95 has a condensation port 953 and a water inlet port 955 coupled to the supply passageway 951. The condensation port 953 is at least coupled to the condensate filter 5, and the water inlet port 955 is at least coupled to the humidification cup 4. Therefore, the supplementary water can be delivered from the humidification cup 4 and output by the condensation port 953. Then, the supplementary water flows into the water tank 2 through the condensate passageway 50 of the condensate filter 5. When the supplementary water flows through the condensate filter 5, the electrolyte filtered by the condensate filter 5 will also be taken away from the condensate filter 5 and be flushed back into the water tank. Therefore, not only the service life of the condensation filter device 5 can be improved but also the consumption of electrolyte can be reduced to improve the use time of the hydrogen generator E. Wherein, the time for replenishing the supplementary water to the water tank can be performed when the electrolytic module 1 stops electrolysis.

The valve assembly 95 further comprises a first valve 958 to keep the gas flow path and the water flow path unobstructed without interfering with each other. Please refer to FIG. 11 and FIG. 15. As shown in FIG. 11 and FIG. 15, the first valve 958 is configured to selectively block the output passageway 950 for decoupling the output passageway 950 with the gas output port 954 and to deblock the supply passageway 951 for coupling the condensation port 953 with the water inlet port 955. Besides, the first valve 958 is also configured to selectively block the supply passageway 951 for decoupling the condensation port 953 with the water inlet port 955 and to deblock the output passageway 950 for coupling the condensation port 953 with the gas output port 954.

Optionally, the valve assembly 95 further comprises an output channel 952 and a second valve 959. The output channel 952 is coupled to the humidification room 40 and the water tank 2. Furthermore, the valve assembly 95 has an output inlet port 956 and an output outlet port 957 both coupled to the output channel 952. The output inlet port 956 is coupled to the output channel 952 and the water tank 2, and the output outlet port 957 is coupled to the output channel 952 and the humidification room 40. When the supplementary water flows into the water tank 2, the gas comprising hydrogen in the water tank 2 can flow to the humidification room 40 through the output channel 952. The second valve 959 is coupled to the output channel 952 and configured to selectively deblock the output channel 952 for coupling the humidification room 40 and the water tank 2.

In one specific embodiment, the first valve 958 interacts with the second valve 959. When the first valve 958 blocks the output passageway 950 and deblocks the supply passageway 951, the second valve 959 also deblocks the output channel 952. When the first valve 958 deblocks the output passageway 950 and blocks the supply passageway 951, the second valve 959 blocks the output channel 952. Therefore, in the process of generating the gas comprising hydrogen, the gas comprising hydrogen in the humidification room 40 will not flow into the water tank 2 from the output channel 952, thereby ensuring the correct flow direction of the gas comprising hydrogen. In practice, the first valve 958 and the second valve 959 can be driven by solenoid valve control.

In order to deliver the supplementary water in the humidification room 40 to the condensate passageway 50 above the humidification room 40, the hydrogen generator E of the present invention further comprises a water guide assembly 96. As shown in FIG. 14 and FIG. 15, the water guide assembly 96 further comprises a water guide passageway 960 and a pump 961. The water guide assembly 96 is coupled to the humidification room 40 and the supply passageway 951. The pump 961 is coupled to the water guide passageway 960 to drive the supplementary water in the humidification room 40 to the water tank 2 through the water guide passageway 960, the supply passageway 951, and the condensate passageway 50. That is to say, the pump 961 can drive the supplementary water in the humidification room 40 to the condensate filter 5 to flush the electrolyte back to the water tank 2 and/or the electrolytic module 1.

Figure 16A:
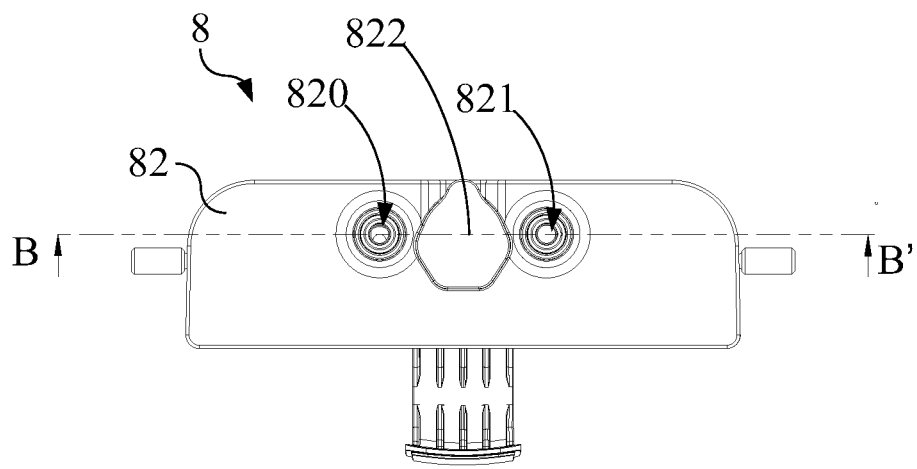
FIG. 16A is a top view of the hydrogen water cup according to the embodiment of FIG. 2.
Figure 16B:
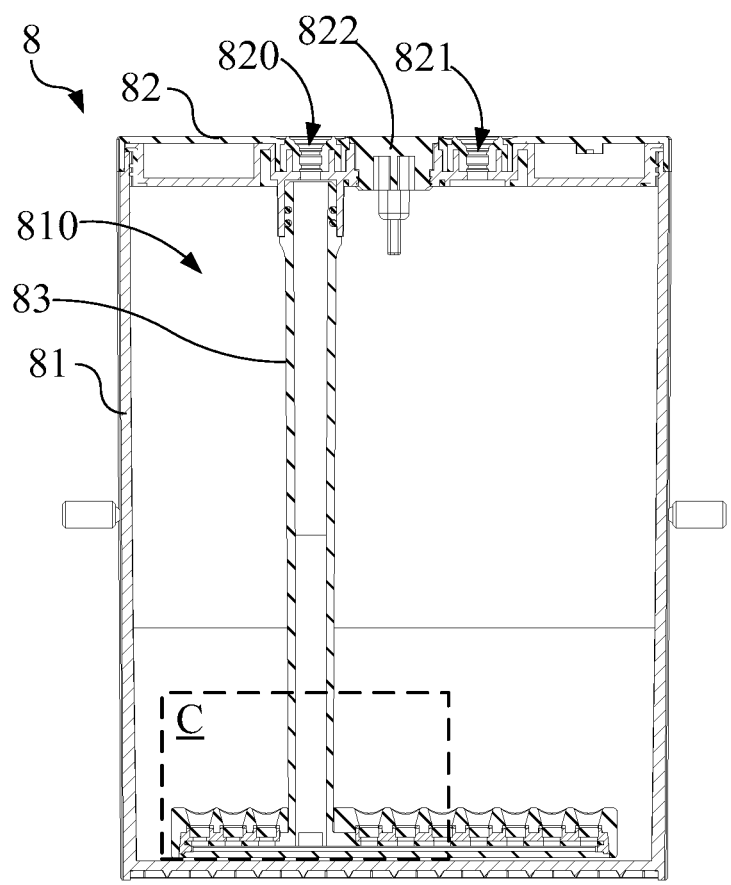
FIG. 16B is a cross-sectional view of the hydrogen water cup along the section line B-B' according to the embodiment of FIG. 16A.
Figure 17:
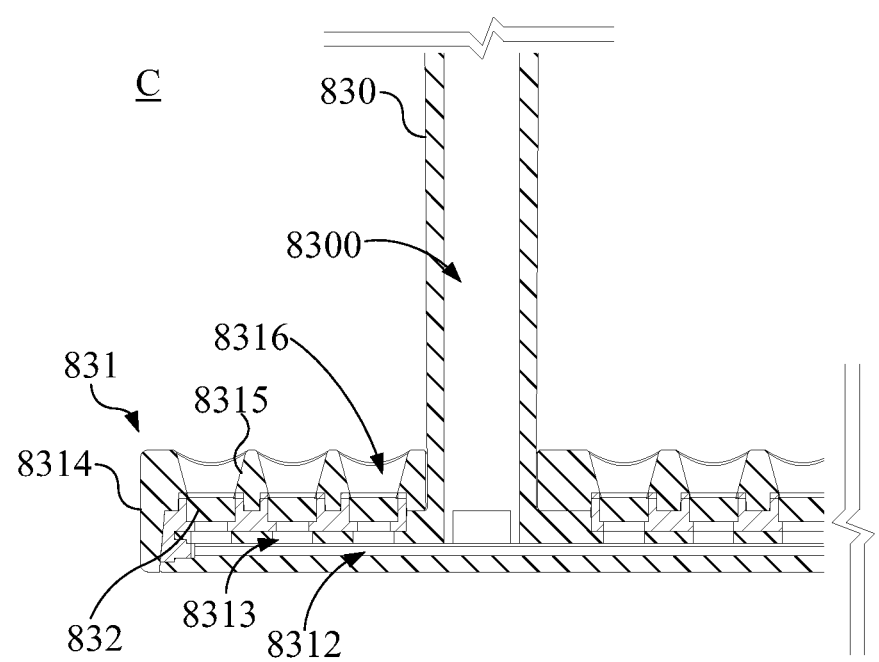
FIG. 17 is a partially enlarged schematic view of the dotted line selection C in FIG. 16B.
Figure 18:
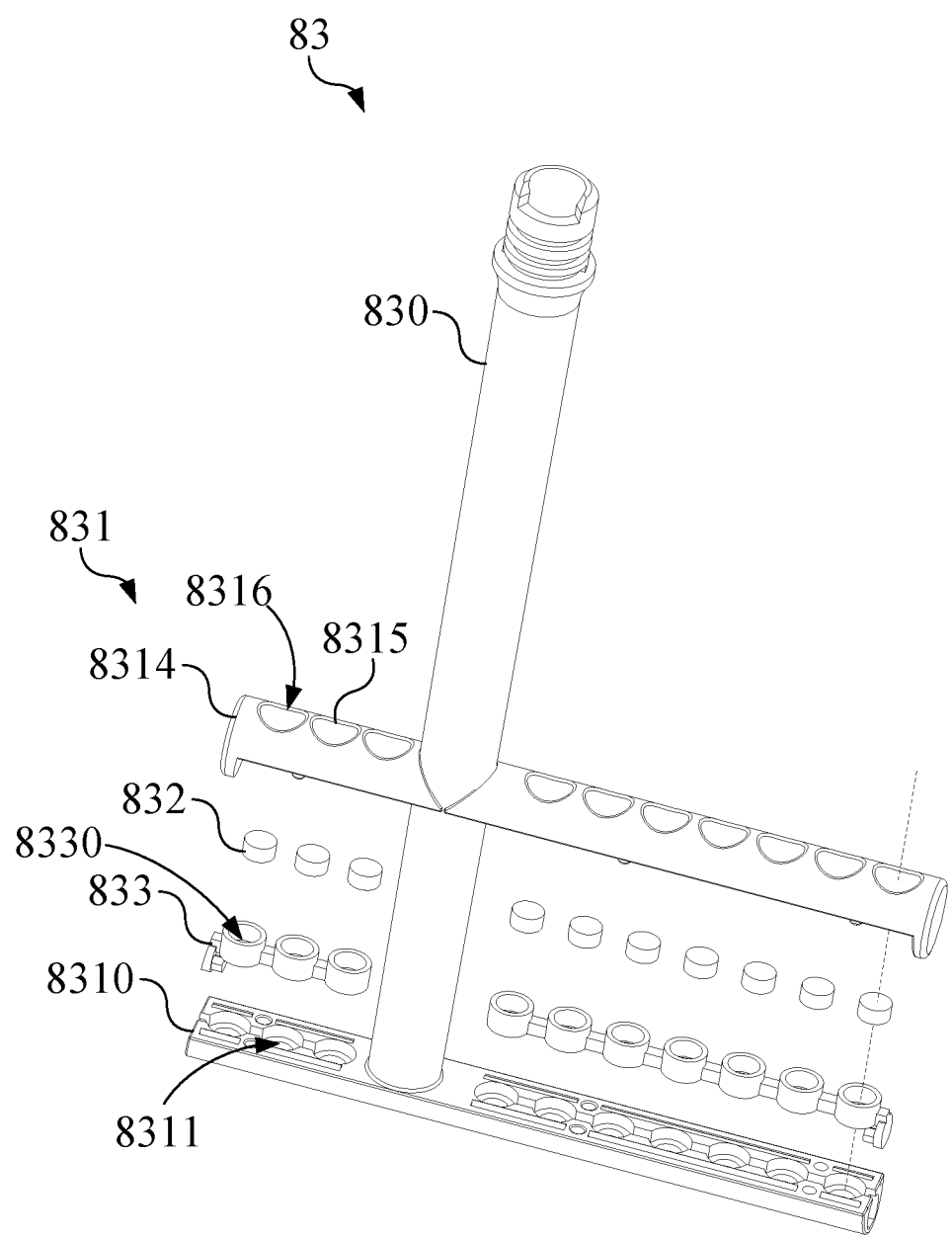
FIG. 18 is an exploded diagram illustrating the injection component according to the embodiment of FIG. 16B.
Figure 19:
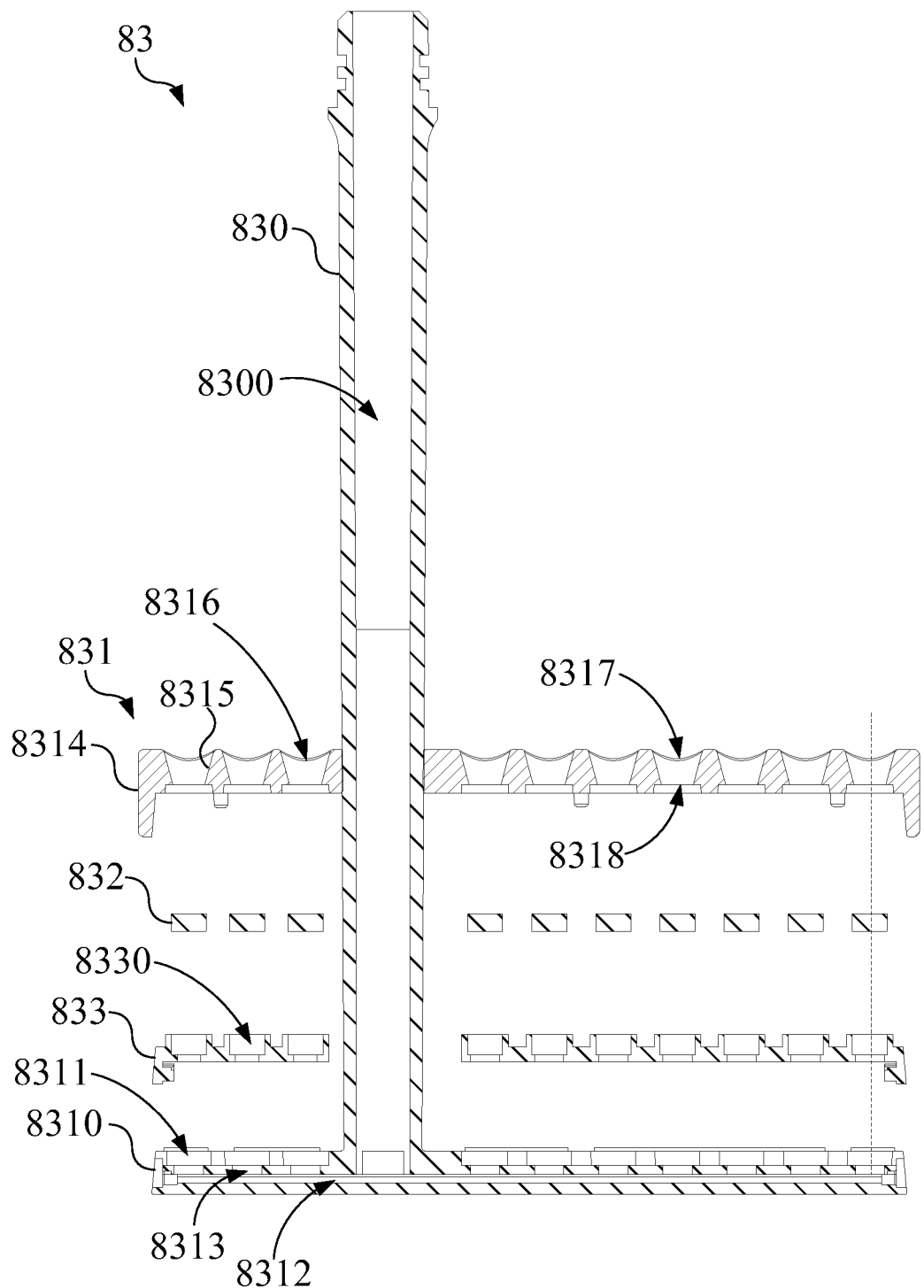
FIG. 19 is a cross-sectional view of the injection component according to the embodiment of FIG. 18.

For the detailed description of the hydrogen water cup 8, please refer to FIG. 16A to FIG. 19. FIG. 16A is a top view of the hydrogen water cup 8 according to the embodiment of FIG. 2. FIG. 16B is a cross-sectional view of the hydrogen water cup 8 along the section line B-B' according to the embodiment of FIG. 16A. FIG. 17 is a partially enlarged schematic view of the dotted line selection C in FIG. 16B. FIG. 18 is an exploded diagram illustrating the injection component 83 according to the embodiment of FIG. 16B. FIG. 19 is a cross-sectional view of the injection component 83 according to the embodiment of FIG. 18. As shown in FIGS. 16A and 16B, the hydrogen water cup 8 of the present invention comprises a cup body 81, a cup cover 82, and an injection component 83. The cup body 81 has an accommodating space 810 for accommodating liquid or drinking water. The cup cover 82 is coupled to the cup body 81, a gas inlet 820 and a gas outlet 821 are configured on the cup cover 82. The injection component 83 is accommodated in the accommodating space 810 and coupled to the gas inlet 820 for injecting the gas comprising hydrogen into liquid or drinking water to form hydrogen liquid or hydrogen water. The cup cover 82 also comprises an input/output port (not shown in the figures) and a water outlet cover 822, wherein the input/output port can be used to supplement the liquid in the hydrogen water cup 8 and output the hydrogen liquid, and the water outlet cover 822 can cover the input/output port.

As shown in FIG. 16A to FIG. 19, the injection component 83 comprises a gas injection column 830 and a gas injection base 831. The gas injection column 830 is coupled to the gas inlet 820 and has a first gas injection channel 8300. The gas injection base 831 can be immersed in the drinking water, and the gas injection base 831 further comprises a gas injection body 8310 and a gas injection housing 8314. The gas injection body 8310 is coupled to the gas injection column 830 and has a second gas injection channel 8312 and a plurality of gas injection pores 8313. The second gas injection channel 8312 is coupled to the first gas injection channel 8300, and the gas injection pores 8313 are coupled to the second gas injection channel 8312 (as shown in FIG. 17). The gas injection housing 8314 is coupled to the gas injection body 8310 and has a microbubble outlet structure 8315, so that the fined gas comprising hydrogen can form a plurality of microbubbles in the drinking water. The microbubble outlet structure 8315 has a plurality of micro outlet channels 8316 corresponding to the gas injection pores 8313. Wherein the micro outlet channels 8316 are coupled to the second gas injection channel 8312 through the gas injection pores 8313. When the gas comprising hydrogen flows into the hydrogen water cup 8 from the gas inlet 820, the gas comprising hydrogen flows through the first gas injection channel 8300, the second gas injection channel 8312, and the micro outlet channels 8316 in sequence, and then forms microbubbles in the drinking water through the microbubble outlet structure 8315.

As shown in FIG. 18 and FIG. 19, the injection component 83 further comprises a plurality of micro filters 832 coupled to the micro outlet channels 8316, respectively. The micro filters 832 can be used to filter the gas comprising hydrogen flowing through the micro outlet channels 8316 to ensure the quality and safety of the gas comprising hydrogen injected into the drinking water. In practice, the micro filters 832 can be an activated carbon filter element, a drinking water filter element, etc., which is not limited thereto. In addition, the micro filters 832 further can be used to cut the gas comprising hydrogen into microbubbles, thereby increasing the concentration of the gas comprising hydrogen dissolved in the water by increasing the interface between the gas comprising hydrogen with the drinking water.

As shown in FIG. 17 and FIG. 19, the micro outlet channel 8316 is a hollow conical frustum with an upper hole 8317 and a lower hole 8318. In one embodiment, an area of the upper hole 8317 is greater than an area of the lower hole 8318. The lower hole 8318 is located between the second gas injection channel 8312 and the micro outlet channel 8316, and the upper hole 8317 is located between the micro outlet channel 8316 and the accommodating space 810. The injection component 83 of the present invention is designed with the hollow conical frustum structure to increase the dispersion degree of the gas comprising hydrogen with the microbubble state when injected into the drinking water. On the contrary, if the area of the upper hole 8317 is smaller than the area of the lower hole 8318 as a structural design, the gas comprising hydrogen with the microbubble state will accumulate to form a large bubble state, thereby reducing the interface between the gas comprising hydrogen with the drinking water.

In order to make the amount of gas comprising hydrogen flowing out of each micro outlet channel 8316 evenly distributed so as to improve the output efficiency and dispersion uniformity of the gas comprising hydrogen in the microbubble state, the second gas injection channel 8312 of the injection component 83 of the present invention gradually becomes larger from the junction with the first gas injection channel 8300 to both ends of the gas injection body 8310. The second gas injection channel 8312 is designed with a narrow middle and wide ends to increase the flow rate of the gas comprising hydrogen from the coupling part to the two ends, to avoid that most of the gas comprising hydrogen is injected into the water from the nearly coupling part but not all the micro outlet channels 8316 can be fully utilized.

The injection component 83 further comprises a fixing member 833. The fixing member 833 has a plurality of fixing poles 8330 configured to accommodate and fix the micro filters 832. The surface of the gas injection body 8310 facing the gas injection housing 8314 has a groove 8311 for accommodating the fixing member 833.

In one specific embodiment, the fining device 43 can also have a design such as the injection component 83 has. In other words, the fining pores 4321 can also be designed as the microbubble outlet structure 8315 to improve the fining effect.

Compared to the prior art, the hydrogen generator of the present invention E has the automatic diversion device 90 to selectively make the gas comprising hydrogen to flow through the hydrogen water cup 8 and selectively control the action of the nebulizer 7 based on the diversion signal, thereby reducing the problem of low frequency sound when the gas comprising hydrogen is injected into the hydrogen water cup 8 and the atomized gas is generated by the nebulizer 7. In addition, the hydrogen water cup 8 of the present invention comprises the microbubble outlet structure 8315 which has the micro outlet channels 8316 with the hollow conical frustum structure, and the fined gas comprising hydrogen is formed into microbubbles in the drinking water and then dissolved into the drinking water to form the hydrogen water. Therefore, the concentration of the gas comprising hydrogen dissolved in water can be improved by increasing the contact area between the gas comprising hydrogen and the drinking water.

The integrated passageway device comprises many channels that can be directly coupled with the nebulizer, the condensate filter, the hydrogen water cup etc.; the integrated passageway device is vertically stacked above the humidification cup and the humidification cup is vertically stacked above the water tank, wherein the condensate filter accommodated in the integrated passageway device can receive the gas comprising hydrogen output from the water tank through the communicating room of the humidification cup. Therefore, the communications between the components in the hydrogen generator E don't need to go through additional pipes (such as another air pipes or water pipes), which reduces the risk of air and water leaks.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the meet's and bounds of the appended claims.

What is claimed is:

1. A hydrogen generator capable of selectively adjusting gas flow direction, comprising:
   an electrolytic module configured to electrolyze water to generate gas comprising hydrogen;
   a hydrogen water cup configured for containing liquid and injecting the gas comprising hydrogen into the liquid to form hydrogen liquid;
   an integrated passageway device stacked above the electrolytic module, comprising a gas inlet passageway, a gas outlet passageway and a gas communication passageway, wherein the gas inlet passageway is configured to receive the gas comprising hydrogen, and the gas outlet passageway is configured to output the gas comprising hydrogen; and
   an automatic diversion device configured to selectively connect the gas inlet passageway, the hydrogen water cup and the gas outlet passageway for injecting the gas comprising hydrogen into the hydrogen water cup and then outputting the gas comprising hydrogen through the gas outlet passageway, or configured to selectively connect the gas inlet passageway, the gas communication passageway, and the gas outlet passageway for outputting the gas comprising hydrogen through the gas communication passageway and the gas outlet passageway.

2. The hydrogen generator of claim 1, further comprising a nebulizer coupled to the gas outlet passageway to receive the gas comprising hydrogen, wherein the nebulizer is capable of selectively generating an atomized gas and mix the atomized gas with the gas comprising hydrogen to form a healthy gas.

3. The hydrogen generator of claim 2, wherein when the gas comprising hydrogen is injected into the hydrogen water cup and then outputted through the gas outlet passageway, the nebulizer generates the atomized gas; when the gas comprising hydrogen is outputted through the gas communication passageway and the gas outlet passageway, the nebulizer stops generating the atomized gas.

4. The hydrogen generator of claim 1, further comprising a condensate filter coupled to the integrated passageway device for condensing and filtering the gas comprising hydrogen; wherein the integrated passageway device comprises a lower cover, and the lower cover has a space for accommodating the condensate filter; the lower cover has a flip structure for the condensate filter to be moveably embedded into the integrated passageway device; wherein the gas comprising hydrogen is transferred among the hydrogen water cup, the automatic diversion device, and the condensate filter by the integrated passageway device; the lower cover is an integral formed structure, and the automatic diversion device and the condensate filter are directly coupled to the lower cover.

5. The hydrogen generator of claim 4, further comprising:
   a water tank stacked below the integrated passageway device and coupled to the electrolytic module, configured for accommodating the water and receiving the gas comprising hydrogen from the electrolytic module;
   a humidification cup stacked above the water tank and having a humidification room and a filter room, wherein the humidification room is configured to accommodate supplementary water; and
   a filter rod accommodated in the filter room for filtering the gas comprising hydrogen flowing through the filter room;
   wherein the gas comprising hydrogen is transferred among the hydrogen water cup, the automatic diversion device, the condensate filter, the humidification cup, and the filter rod by the integrated passageway device, and the automatic diversion device, the condensate filter, and the humidification cup are directly coupled to the lower cover.

6. The hydrogen generator of claim 2, further comprising a filter device pluggably coupled to the nebulizer for filtering germs in the gas comprising hydrogen.

7. A hydrogen generator capable of selectively adjusting gas flow direction, comprising:

an electrolytic module configured to electrolyze water to generate gas comprising hydrogen;

a water tank configured to accommodate the water and fluidly coupled to the electrolytic module for receiving the gas comprising hydrogen from the electrolytic module;

a condensate filter stacked above the water tank for receiving and filtering the gas comprising hydrogen;

a humidification cup stacked above the water tank, configured to accommodate a supplementary water and humidify the gas comprising hydrogen;

an integrated passageway device stacked above the water tank, comprising a plurality of channels, a gas inlet passageway, and a gas outlet passageway, wherein the gas inlet passageway is configured to receive the gas comprising hydrogen, and the gas outlet passageway is configured to output the gas comprising hydrogen;

a hydrogen water cup configured for containing liquid, wherein the hydrogen water cup is capable of receiving the gas comprising hydrogen and mixing the gas comprising hydrogen with the liquid to form hydrogen liquid;

a valve assembly configured to selectively make the gas comprising hydrogen from the water tank to flow into the condensate filter and the humidification cup, and also to selectively make the supplementary water to flow into the condensate filter and the water tank;

wherein the integrated passageway device comprises a lower cover, and the lower cover has a space for accommodating the condensate filter; the condensate filter and the humidification cup are directly coupled to the integrated passageway device.

8. The hydrogen generator of claim 7, wherein the integrated passageway device has a flip structure configured for the condensate filter to be moveably embedded into the integrated passageway device.

9. The hydrogen generator of claim 7, further comprising an automatic diversion device and a nebulizer configured to selectively generate an atomized gas and mix the atomized gas with the gas comprising hydrogen to form a healthy gas, and the integrated passageway device comprising a gas communication passageway, wherein the automatic diversion device is configured to selectively connect the gas inlet passageway, the hydrogen water cup and the gas outlet passageway for injecting the gas comprising hydrogen into the hydrogen water cup and then outputting the gas comprising hydrogen through the gas outlet passageway, or configured to selectively connect the gas inlet passageway, the gas communication passageway and the gas outlet passageway for outputting the gas comprising hydrogen through the gas communication passageway and the gas outlet passageway; wherein the gas comprising hydrogen is transferred among the condensate filter, the humidification cup, the hydrogen water cup, the nebulizer, the valve assembly and the automatic diversion device by the integrated passageway device, and the condensate filter, the humidification cup, the nebulizer and the automatic diversion device are directly coupled to the integrated passageway device.

10. The hydrogen generator of claim 9, wherein when the automatic diversion device connects the gas inlet passageway, the gas communication passageway and the gas outlet passageway for outputting the gas comprising hydrogen through the gas communication passageway and the gas outlet passageway, the nebulizer stops the operation.

11. The hydrogen generator of claim 7, wherein the hydrogen water cup is directly coupled to the integrated passageway device.

12. The hydrogen generator of claim 7, further comprising a fining device configured in the humidification cup, wherein the fining device comprises a communicating column and a fining base plate, and the fining base plate comprises a fining channel and a plurality of fining pores; wherein the sectional area of the fining channel is non-uniform.

13. A hydrogen generator capable of selectively adjusting gas flow direction, comprising:

an electrolytic module configured to electrolyze water to generate gas comprising hydrogen;

a water tank configured to accommodate the water and fluidly coupled to the electrolytic module for receiving the gas comprising hydrogen from the electrolytic module;

a condensate filter stacked above the water tank for receiving and filtering the gas comprising hydrogen;

a humidification cup stacked above the water tank, configured to accommodate supplementary water and humidify the gas comprising hydrogen; and an integrated passageway device stacked above the water tank and directly coupled to the condensate filter and the humidification cup;

wherein the gas comprising hydrogen is transferred between the condensate filter and the humidification cup by the integrated passageway device;

wherein the humidification cup comprises a humidification room configured to accommodate the supplementary water and a filter room configured to accommodate a filter rod for filtering the gas comprising hydrogen flowing through the filter room, and the humidification room and the filter room are physically separated from each other.

14. The hydrogen generator of claim 13, further comprising:

a nebulizer configured to selectively generate an atomized gas and mix the atomized gas with the gas comprising hydrogen to form a healthy gas; wherein the nebulizer is directly coupled to the integrated passageway device, and the gas comprising hydrogen is transferred among the condensate filter, the humidification cup and the nebulizer by the integrated passageway device.

15. The hydrogen generator of claim 14, further comprising:

a hydrogen water cup configured for containing liquid, wherein the hydrogen water cup is capable to receive the gas comprising hydrogen and mix the gas comprising hydrogen with the liquid to form hydrogen liquid; the hydrogen water cup is directly coupled to the integrated passageway device, and the gas comprising hydrogen is transferred among the condensate filter, the humidification cup, the hydrogen water cup and the nebulizer by the integrated passageway device.

* * * * *